US009145805B2

(12) United States Patent
Sato et al.

(10) Patent No.: US 9,145,805 B2
(45) Date of Patent: Sep. 29, 2015

(54) EXHAUST GAS PURIFIER

(75) Inventors: Shinya Sato, Hino (JP); Hiroshi Hirabayashi, Hino (JP); Keiichi Hayashizaki, Hino (JP); Yoshihiro Kawada, Hino (JP); Mitsuru Hosoya, Hino (JP)

(73) Assignee: Hino Motors, Ltd., Tokyo (JP)

( * ) Notice: Subject to any disclaimer, the term of this patent is extended or adjusted under 35 U.S.C. 154(b) by 16 days.

(21) Appl. No.: 14/342,711

(22) PCT Filed: Sep. 3, 2012

(86) PCT No.: PCT/JP2012/072328
§ 371 (c)(1),
(2), (4) Date: May 2, 2014

(87) PCT Pub. No.: WO2013/035663
PCT Pub. Date: Mar. 14, 2013

(65) Prior Publication Data
US 2014/0260208 A1     Sep. 18, 2014

(30) Foreign Application Priority Data

Sep. 5, 2011  (JP) .................................. 2011-192768
Sep. 5, 2011  (JP) .................................. 2011-192770

(51) Int. Cl.
*F01N 3/26* (2006.01)
*F01N 3/18* (2006.01)
(Continued)

(52) U.S. Cl.
CPC .............. *F01N 3/18* (2013.01); *B01D 53/9409* (2013.01); *B01D 53/9418* (2013.01);
(Continued)

(58) Field of Classification Search
CPC ....... F01N 3/2073; F01N 3/208; F01N 3/2803; F01N 3/36; F01N 13/0093; F01N 13/0097; F01N 2240/28; F01N 2240/38; F01N 2370/04; F01N 2610/03
USPC .............................. 60/275, 286, 295, 301, 303
See application file for complete search history.

(56) References Cited

U.S. PATENT DOCUMENTS 6,957,528 B1 * 10/2005 Cho ................................. 60/275
2008/0066456 A1 * 3/2008 Schmieg et al. ................ 60/286
(Continued)

FOREIGN PATENT DOCUMENTS

EP        1 582 711 A1     10/2005
JP        2000-054833 A     2/2000
(Continued)

OTHER PUBLICATIONS

Supplementary European Search Report, mailed Mar. 20, 2015, for EP 12 83 0826, 6 pages.
(Continued)

*Primary Examiner* — Thomas Denion
*Assistant Examiner* — Jorge Leon, Jr.
(74) *Attorney, Agent, or Firm* — Seed IP Law Group PLLC

(57) ABSTRACT

A first selective reduction catalyst including a silver-based catalyst is provided in an exhaust pipe of an engine. An ozone generation device generates ozone by using oxygen in the atmosphere, and a hydrocarbon-based liquid supply device supplies a hydrocarbon-based liquid. A part of NO in the exhaust gas flowing through the exhaust pipe is oxidized to $NO_2$ with the ozone generated by the ozone generation device, and said $NO_2$ is supplied to the first selective reduction catalyst. Also, a part of the hydrocarbon-based liquid supplied by the hydrocarbon-based liquid supply device is partially oxidized, with ozone generated by the ozone generation device, to an active reducing agent including an oxygen-containing hydrocarbon such as aldehyde, and this active reducing agent is supplied to the first selective reduction catalyst.

10 Claims, 15 Drawing Sheets

(51) Int. Cl.
*F01N 3/20* (2006.01)
*F01N 3/28* (2006.01)
*B01J 37/02* (2006.01)
*B01J 29/068* (2006.01)
*B01D 53/94* (2006.01)
*C01B 13/11* (2006.01)
*C01B 3/38* (2006.01)
*B01J 35/00* (2006.01)
*B01J 29/072* (2006.01)
*F01N 13/00* (2010.01)
*F01N 3/36* (2006.01)

(52) U.S. Cl.
CPC ............ *B01J 29/068* (2013.01); *B01J 29/072* (2013.01); *B01J 35/0006* (2013.01); *B01J 37/0246* (2013.01); *C01B 3/386* (2013.01); *C01B 13/11* (2013.01); *F01N 3/208* (2013.01); *F01N 3/2066* (2013.01); *F01N 3/2073* (2013.01); *F01N 3/2803* (2013.01); *F01N 13/0093* (2014.06); *B01D 2251/104* (2013.01); *B01D 2251/208* (2013.01); *B01D 2251/21* (2013.01); *B01D 2255/104* (2013.01); *B01D 2255/1021* (2013.01); *B01D 2255/1023* (2013.01); *B01D 2255/20761* (2013.01); *B01D 2255/50* (2013.01); *B01D 2255/9032* (2013.01); *B01D 2255/9035* (2013.01); *B01D 2258/012* (2013.01); *C01B 2203/0261* (2013.01); *C01B 2203/06* (2013.01); *F01N 3/36* (2013.01); *F01N 13/0097* (2014.06); *F01N 2240/28* (2013.01); *F01N 2240/38* (2013.01); *F01N 2370/04* (2013.01); *F01N 2610/03* (2013.01); *Y02T 10/24* (2013.01)

(56) References Cited

U.S. PATENT DOCUMENTS

| | | | | |
|---|---|---|---|---|
| 2008/0127634 | A1* | 6/2008 | Cho et al. | 60/286 |
| 2009/0205315 | A1* | 8/2009 | Kakinohana et al. | 60/274 |
| 2009/0266063 | A1* | 10/2009 | Gandhi et al. | 60/301 |
| 2010/0192545 | A1* | 8/2010 | Schmieg et al. | 60/286 |
| 2011/0011068 | A1* | 1/2011 | Ren et al. | 60/297 |
| 2011/0052454 | A1* | 3/2011 | Kato | 422/171 |
| 2011/0138783 | A1* | 6/2011 | Sakurai | 60/276 |

FOREIGN PATENT DOCUMENTS

| | | |
|---|---|---|
| JP | 2005-264776 A | 9/2005 |
| JP | 2005-291071 A | 10/2005 |
| JP | 2006-150211 A | 6/2006 |
| JP | 2009-264320 A | 11/2009 |
| JP | 2011-085060 A | 4/2011 |
| WO | 2010-005941 A1 | 1/2010 |

OTHER PUBLICATIONS

International Search Report, mailed Oct. 9, 2012, for PCT/JP2012/072328, 4 pages.
International Preliminary Report on Patentability dated Jul. 10, 2013, for corresponding International Application No. PCT/JP2012/072328, 7 pages.
Written Opinion of the International Searching Authority dated Oct. 1, 2012, for corresponding International Application No. PCT/JP2012/072328, 8 pages.

* cited by examiner

EXHAUST GAS PURIFIER

TECHNICAL FIELD

The present invention relates to an apparatus for decreasing nitrogen oxides (hereinafter referred to as "NOx") contained in an exhaust gas of an engine such as a diesel engine, to thereby purify the exhaust gas.

BACKGROUND ART

Conventionally, there is disclosed an exhaust purifier of an internal combustion engine in which at least a part of a harmful component in an exhaust gas from an internal combustion engine is concentrated by a concentration device, at least a part of the harmful component concentrated by the concentration device is converted into a highly reactive gas by a conversion device, and the harmful component, at least a part of which has been converted into the highly reactive gas by the conversion device, is purified by an exhaust gas purification catalyst (see, for example, Patent Literature 1). In this exhaust purifier of the internal combustion engine, the conversion device is a device that adds an oxidizing agent to the harmful component, which is concentrated by the concentration device, to oxidize at least a part of the harmful component and to convert it into a highly reactive gas. Also, the oxidizing agent is ozone, and this ozone is generated by electrolyzing water by a water electrolysis device. Here, in the water electrolysis device, hydrogen ($H_2$) is formed along with ozone at a time of electrolysis of water. Specifically, water is decomposed on an anode side partitioned by a cation exchange membrane to generate ozone, and a hydrogen gas is generated on a cathode side from a hydrogen ion which has passed through the cation exchange membrane. Furthermore, an adsorbent is housed in the concentration device, and an ozone adding valve is provided as the conversion device in an exhaust pipe on an exhaust gas upstream side of the concentration device.

In the thus configured exhaust purifier of the internal combustion engine, the concentration device concentrates the at least part of the harmful component in the exhaust gas from the internal combustion engine. Specifically, a hydrocarbon and NOx in the exhaust gas are temporarily adsorbed onto the adsorbent housed in the concentration device, to thereby concentrate the hydrocarbon and NOx. Ozone ($O_3$) as the oxidizing agent is injected from the ozone adding valve toward the adsorbent of the concentration device. Thereby, ozone is added to the harmful component adsorbed onto the adsorbent. At this time, at least a part of the hydrocarbon and NOx adsorbed onto the adsorbent are oxidized and converted into a highly reactive gas due to high oxidation activity of ozone. For example, among hydrocarbons, when an olefinic hydrocarbon is converted into an oxygen-containing hydrocarbon such as an aldehyde, the reactivity becomes high, and nitrogen monoxide (NO) of NOx is oxidized and converted into nitrogen dioxide ($NO_2$), whereby the reactivity becomes high. The harmful component, the at least part of which has been converted into the highly reactive gas by the addition of ozone, is supplied to the exhaust purification catalyst on the downstream side. Then, in the case where the exhaust purification catalyst is a selective reduction catalyst, in this selective reduction catalyst, the partially oxidized hydrocarbon and nitrogen dioxide ($NO_2$) are caused to react with each other and finally purified into carbon dioxide, water, and nitrogen.

Meanwhile, there is disclosed an exhaust gas purifier of an internal combustion engine, which is configured so that a catalyst for purifying a harmful component in an exhaust gas is disposed in an exhaust passage of the internal combustion engine; that an active oxygen supply device supplies active oxygen into the exhaust passage on an exhaust gas upstream side of this catalyst; that an unburned fuel component supply means increases the concentration of the unburned fuel component in the exhaust gas flowing through the exhaust passage on the exhaust gas upstream side of the catalyst to be higher than usual; and that in the case where an increase in temperature of the catalyst is required, not only a catalyst temperature-increasing means supplies active oxygen into the exhaust passage on the exhaust gas upstream side of the catalyst by the active oxygen supply device, but also the unburned fuel component supply means increases the concentration of the unburned fuel component in the exhaust gas flowing through the exhaust passage on the exhaust gas upstream side of the catalyst (see, for example, Patent Literature 2). In this exhaust gas purifier of the internal combustion engine, the catalyst contains Ag as a catalyst component. Also, the active oxygen supply device is configured so as to supply ozone as the active oxygen.

In the thus configured exhaust gas purifier of the internal combustion engine, in the case where an increase of the temperature of the catalyst is required, a catalyst temperature-increasing control for adding active oxygen and an unburned fuel component to the exhaust gas flowing through the exhaust passage on the exhaust gas upstream side of the catalyst can be executed. Since the active oxygen has a strong oxidation power, the added active oxygen and unburned fuel component can efficiently react with each other even from a low temperature. For that reason, the temperature of the catalyst can be rapidly increased utilizing a reaction heat thereof. Also, since the catalyst contains Ag, when the active oxygen and the unburned fuel component are added by means of the catalyst temperature-increasing control, CO is generated due to a reaction therebetween. Ag expresses activity for efficiently oxidizing CO from a low temperature in the copresence of the active oxygen. For that reason, CO generated due to the reaction between the active oxygen and the unburned fuel component, which are added during the catalyst temperature-increasing control, can be oxidized and purified while Ag acts as a catalyst.

CITATION LIST

Patent Literature

Patent Literature 1: JP 2011-85060 A (claims 1 to 4, paragraphs [0017], [0018] and [0022], and FIG. 1)

Patent Literature 2: JP 2009-264320 A (claims 1, 2 and 5, paragraphs [0012] and [0013], and FIG. 1)

SUMMARY OF THE INVENTION

Technical Problem

However, in the exhaust purifier of the internal combustion engine disclosed in the above-described conventional Patent Literature 1, since the hydrocarbon and NOx, which are adsorbed onto the adsorbent, are converted into the oxygen-containing hydrocarbon such as an aldehyde, and nitrogen dioxide ($NO_2$) by means of the oxidation activity of ozone, there is such an inconvenience that the concentration device having the adsorbent housed therein, which concentrates the harmful component in the exhaust gas, is required. Also, in the exhaust purifier of the internal combustion engine disclosed in the above-described conventional Patent Literature 1, the hydrocarbon which is to be adsorbed onto the absorbent is the harmful component discharged from the engine, a hydrocarbon supply device that positively supplies this hydrocarbon into the exhaust pipe is not provided, and an amount of hydrocarbon to be adsorbed onto the adsorbent is small. Therefore, an amount of oxygen-containing hydrocarbon such as an aldehyde which is obtained by partial oxidation of the hydrocarbon with ozone, is also small, which results in that there is also such a problem that the selective reduction catalyst cannot sufficiently exhibit a NOx decreasing performance. Meanwhile, in the exhaust gas purifier of the internal combustion engine disclosed in the above-described conventional Patent Literature 2, if the exhaust gas temperature reaches 250° C. or higher and a surplus of the unburned fuel component (hydrocarbon) flows into the catalyst containing Ag, CO having a small effect in decreasing NOx in the exhaust gas on this catalyst is generated.

A first object of the present invention is to provide an exhaust gas purifier that can efficiently decrease NOx in an exhaust gas over a wide range of exhaust gas temperatures by oxidizing NO in the exhaust gas to $NO_2$ with ozone and partially oxidizing a hydrocarbon-based liquid to an active reducing agent including an oxygen-containing hydrocarbon such as an aldehyde with ozone, without using a concentration device having an adsorbent housed therein. A second object of the present invention is to provide an exhaust gas purifier in which by positively supplying a hydrocarbon-based liquid by using a hydrocarbon-based liquid supply device, an amount of an active reducing agent including an oxygen-containing hydrocarbon such as an aldehyde, which is obtained by partial oxidation of the hydrocarbon-based liquid with ozone, can be sufficiently ensured, whereby a selective reduction catalyst can sufficiently exhibit a NOx decreasing performance. A third object of the present invention is to provide an exhaust gas purifier that can generate an aldehyde, an alcohol, and the like capable of effectively decreasing NOx in an exhaust gas and that can efficiently decrease NOx in the exhaust gas over a wide range of exhaust gas temperatures.

Solution to Problem

A first aspect of the present invention, as shown in FIG. 1, is an exhaust gas purifier including a first selective reduction catalyst 21 that is provided in an exhaust pipe 16 of an engine 11 and that includes a silver-based catalyst, an ozone generation device 40 that generates ozone by using oxygen in an atmosphere or an exhaust gas, and a hydrocarbon-based liquid supply device 24 that supplies a hydrocarbon-based liquid. A part of NO in the exhaust gas flowing through the exhaust pipe 16 is oxidized to $NO_2$ with ozone generated by the ozone generation device 40. This $NO_2$ is supplied to the first selective reduction catalyst 21. A part of the hydrocarbon-based liquid supplied by the hydrocarbon-based liquid supply device 24 is partially oxidized, with the ozone generated by the ozone generation device 40, to an active reducing agent including an oxygen-containing hydrocarbon containing either or both of aldehyde and alcohol. The active reducing agent is supplied to the first selective reduction catalyst 21.

A second aspect of the present invention is the invention based on the first aspect further includes, as shown in FIG. 9, a second selective reduction catalyst 22 that is provided in the exhaust pipe 16 on an exhaust gas downstream side of the first selective reduction catalyst 21 and that includes a copper-based catalyst, an iron-based catalyst, or a vanadium-based catalyst.

In a third aspect of the present invention that is the invention based on the first aspect, as further shown in FIG. 1, the hydrocarbon-based liquid supply device 24 is connected to the exhaust pipe 16 on an exhaust gas upstream side of the first selective reduction catalyst 21. The ozone generation device 40 is connected to the exhaust pipe 16 on the exhaust gas upstream side of the first selective reduction catalyst 21 and on the exhaust gas downstream side or the exhaust gas upstream side (not shown) of a connection portion between the hydrocarbon-based liquid supply device 24 and the exhaust pipe 16.

In a fourth aspect of the present invention that is the invention based on the first aspect, as further shown in FIG. 7, the ozone generation device 40 is connected to the exhaust pipe 16 on an exhaust gas upstream side of the first selective reduction catalyst 21 via a gas supply device 81. The hydrocarbon-based liquid supply device 24 is connected on an intermediate portion of the gas supply device 81.

In a fifth aspect of the present invention that is the invention based on the first aspect, as further shown in FIG. 8, the ozone generation device includes a first ozone generation device 101 and a second ozone generation device 102. The first ozone generation device 101 is connected to the exhaust pipe 16 on an exhaust gas upstream side of the first selective reduction catalyst 21 via an ozone supply device 103. The second ozone generation device 102 is connected, via a gas supply device 107, to the exhaust pipe 16 on the exhaust gas upstream side of the first selective reduction catalyst 21 and on an exhaust gas downstream side or the exhaust gas upstream side (not shown) of a connection portion between the first ozone generation device 101 and the exhaust pipe 16. The hydrocarbon-based liquid supply device 24 is connected to an intermediate portion of the gas supply device 107.

In a sixth aspect of the present invention that is the invention based on the fourth aspect, as further shown in FIG. 7, a mixing chamber 84 is provided in a connection portion between the hydrocarbon-based liquid supply device 24 and the gas supply device 81.

In a seventh aspect of the present invention that is the invention based on the fifth aspect, as further shown in FIG. 8, a mixing chamber 111 is provided in a connection portion between the hydrocarbon-based liquid supply device 24 and the gas supply device 107.

An eight aspect of the present invention is the invention based on the second aspect and further includes, as further shown in FIG. 9, a third selective reduction catalyst 23 that includes a noble metal-based catalyst and that is provided in the exhaust pipe 16 on the exhaust gas downstream side of the second selective reduction catalyst 22.

In a ninth aspect of the present invention that is the invention based on the first aspect, as further shown in FIG. 1, the first selective reduction catalyst 21 includes a honeycomb carrier coated with a silver zeolite or a silver alumina.

In a tenth aspect of the present invention that is the invention based on the second aspect, as further shown in FIG. 9, the second selective reduction catalyst 22 includes a honeycomb carrier coated with a copper zeolite, an iron zeolite, or a vanadium-based oxide.

In an eleventh aspect of the present invention that is the invention based on the eighth aspect, as further shown in FIG. 9, the third selective reduction catalyst 23 includes a honeycomb carrier coated with a noble metal.

In a twelfth aspect of the present invention that is the invention based on the first aspect, the first selective reduction catalyst 21 includes a honeycomb carrier coated with a silver zeolite to which palladium is added or a silver alumina to which palladium is added.

Advantageous Effects of Invention

According to the exhaust gas purifier of the first aspect of the present invention, a part of NO in the exhaust gas flowing through the exhaust pipe is oxidized to $NO_2$ with the ozone generated by the ozone generation device and is supplied to the first selective reduction catalyst including the silver-based catalyst. Since the above-described $NO_2$ has high reactivity with the NOx reducing agent in the first selective reduction catalyst, NOx in the exhaust gas can be efficiently decreased in a relatively low temperature region where the exhaust gas temperature is from 200 to 250° C. Meanwhile, the hydrocarbon-based liquid supplied by the hydrocarbon-based liquid supply device is partially oxidized to the active reducing agent including the oxygen-containing hydrocarbon such as aldehyde and is supplied to the first selective reduction catalyst including the silver-based catalyst. Since the above-described active reducing agent including the oxygen-containing hydrocarbon such as aldehyde has higher reactivity as the NOx reducing agent in the first selective reduction catalyst than the gasified hydrocarbon-based liquid, NOx in the exhaust gas can be efficiently decreased within the relatively wide temperature range where the exhaust gas temperature is from 250 to 500° C. As a result, NOx in the exhaust gas can be efficiently decreased over a wide temperature range where the exhaust gas temperature is from 200 to 500° C.

Also, as compared with the conventional exhaust purifier of an internal combustion engine requiring a concentration device that houses an adsorbent for adsorbing a hydrocarbon and NOx and that concentrates a harmful component in an exhaust gas, in the present invention, not only NO in the exhaust gas can be oxidized to $NO_2$ with ozone, but also the hydrocarbon-based liquid can be partially oxidized with ozone to the active reducing agent including the oxygen-containing hydrocarbon such as an aldehyde, without a concentration device that houses an adsorbent for adsorbing a hydrocarbon and NOx and that concentrates a harmful component in an exhaust gas. Furthermore, as compared with the conventional exhaust purifier of the internal combustion engine in which a hydrocarbon supply device that positively supplies hydrocarbon to an exhaust pipe is not provided; a small amount of the hydrocarbon to be adsorbed onto the adsorbent leads to that a small amount of the oxygen-containing hydrocarbon such as aldehyde, which is obtained by partial oxidation of the hydrocarbon with ozone, and the selective reduction catalyst cannot sufficiently exhibit a NOx decreasing performance, in the present invention, by positively supplying the hydrocarbon-based liquid by means of the hydrocarbon-based liquid supply device, the amount of the active reducing agent including the oxygen-containing hydrocarbon such as aldehyde, which is obtained by the partial oxidation of the hydrocarbon-based liquid with the ozone, can be sufficiently ensured, and therefore, the first selective reduction catalyst can sufficiently exhibit the NOx decreasing performance.

According to the exhaust gas purifier of the second aspect of the present invention, a part of NO in the exhaust gas flowing through the exhaust pipe is oxidized to $NO_2$ with the ozone generated by the ozone generation device and is supplied to the first selective reduction catalyst including the silver-based catalyst. Since the above-described $NO_2$ has high reactivity with the NOx reducing agent in the first selective reduction catalyst, NOx in the exhaust gas can be efficiently decreased in the relatively low temperature region where the exhaust gas temperature is from 200 to 250° C. Meanwhile, the part of the hydrocarbon-based liquid supplied by the hydrocarbon-based liquid supply device is partially oxidized to the active reducing agent including the oxygen-containing hydrocarbon such as aldehyde and supplied to the first selective reduction catalyst including the silver-based catalyst. Since the above-described active reducing agent including the oxygen-containing hydrocarbon such as aldehyde has higher reactivity as the NOx reducing agent in the first selective reduction catalyst than the gasified hydrocarbon-based liquid, NOx in the exhaust gas can be efficiently decreased within a relatively wide temperature range where the exhaust gas temperature is from 250 to 500° C. Furthermore, when a surplus of the hydrocarbon-based liquid flows into the silver-based first selective reduction catalyst together with the exhaust gas containing NOx in a state where the exhaust gas temperature is in the range of from 250 to 500° C., ammonia is generated on this first selective reduction catalyst. When this exhaust gas containing ammonia flows into the copper-based, iron-based, or vanadium-based second selective reduction catalyst, ammonia and NOx react with each other on this second selective reduction catalyst, whereby a reduction reaction of NOx and an oxidation reaction of ammonia are promoted, and therefore, the efficiency for decreasing NOx in the exhaust gas in a high temperature region of the exhaust gas can be enhanced. As a result, not only the release of ammonia into the atmosphere can be prevented, but also NOx in the exhaust gas can be efficiently decreased over a wide range of exhaust gas temperatures.

According to the exhaust gas purifier of the third aspect of the present invention, the hydrocarbon-based liquid supply device is connected to the exhaust pipe on the exhaust gas upstream side of the first selective reduction catalyst, and the ozone generation device is connected to the exhaust pipe on the exhaust gas upstream side of the first selective reduction catalyst. Therefore, NOx in the exhaust gas can be relatively efficiently decreased over a wide range of exhaust gas temperatures by means of a relatively simple piping configuration.

According to the exhaust gas purifier of the fourth aspect of the present invention, when the hydrocarbon-based liquid supplied by the hydrocarbon-based liquid supply device is mixed with the ozone generated by ozone generation device in the intermediate portion of the gas supply unit, the hydrocarbon-based liquid is partially oxidized, with a part of ozone, to the active reducing agent including the oxygen-containing hydrocarbon such as aldehyde. At that time, since ozone with a high concentration and the hydrocarbon-based liquid with a high concentration can be mixed, the reaction between ozone and the hydrocarbon-based liquid becomes fast, whereby the partial oxidation of the hydrocarbon-based liquid to the active reducing agent with ozone can be promoted. When this partially oxidized active reducing agent is supplied to the exhaust pipe, since the reactivity of the active reducing agent as the NOx reducing agent in the first selective reduction catalyst is higher than that of the gasified hydrocarbon-based liquid, NOx in the exhaust gas can be efficiently decreased within the relatively wide temperature range where the exhaust gas temperature is from 250 to 500° C. Also, of the ozone generated by the ozone generation device, the remaining ozone which is not used for the partial oxidation of the above-described hydrocarbon-based liquid to the active reducing agent is supplied to the exhaust pipe as it is, and a part of NO in the exhaust gas flowing through the exhaust pipe is oxidized to $NO_2$ with this ozone. When this oxidized $NO_2$ is supplied to the first selective reduction catalyst, since this $NO_2$ has high reactivity with the NOx reducing agent (the gasified hydrocarbon-based liquid or the active reducing agent) in the first selective reduction catalyst, NOx in the exhaust gas can be efficiently decreased in the relatively low temperature region where the exhaust gas temperature is from 200 to 250° C. As a result, NOx in the exhaust gas can be further efficiently decreased over the wide range of exhaust gas temperatures.

According to the exhaust gas purifier of the fifth aspect of the present invention, when a part of NO in the exhaust gas flowing through the exhaust pipe is oxidized to $NO_2$ with the ozone generated by the first ozone generation device and this oxidized $NO_2$ is supplied to the first selective reduction catalyst, since this $NO_2$ has high reactivity with the NOx reducing agent (the gasified hydrocarbon-based liquid or the active reducing agent) in the first selective reduction catalyst, NOx in the exhaust gas can be efficiently decreased in the relatively low temperature region where the exhaust gas temperature is from 200 to 250° C. Also, when the hydrocarbon-based liquid supplied by the hydrocarbon-based liquid supply device is mixed with ozone generated by the second ozone generation device in the intermediate portion of the gas supply device, the above-described hydrocarbon-based liquid is partially oxidized with ozone to the active reducing agent including the oxygen-containing hydrocarbon such as aldehyde. At that time, since ozone with a high concentration and the hydrocarbon-based liquid with a high concentration can be mixed, the reaction between the ozone and the hydrocarbon-based liquid becomes fast, whereby the partial oxidation of the hydrocarbon-based liquid to the active reducing agent with the ozone can be promoted. When this partially oxidized active reducing agent is supplied to the exhaust pipe, since the reactivity of the active reducing agent as the NOx reducing agent in the first selective reduction catalyst is higher than that of the gasified hydrocarbon-based liquid, NOx in the exhaust gas can be efficiently decreased within the relatively wide temperature range where the exhaust gas temperature is from 250 to 500° C. As a result, NOx in the exhaust gas can be further efficiently decreased over the wide range of exhaust gas temperatures.

According to the exhaust gas purifier of the sixth aspect of the present invention, since the hydrocarbon-based liquid supplied from the hydrocarbon-based liquid supply device is mixed with the ozone generated by the ozone generation device in the mixing chamber, the hydrocarbon-based liquid can be efficiently mixed with the ozone. As a result, the hydrocarbon-based liquid can be efficiently partially oxidized to the active reducing agent including the oxygen-containing hydrocarbon such as aldehyde.

According to the exhaust gas purifier of the seventh aspect of the present invention, since the hydrocarbon-based liquid supplied from the hydrocarbon-based liquid supply device is mixed with the ozone generated by the second ozone generation device in the mixing chamber, the hydrocarbon-based liquid can be efficiently mixed with ozone. As a result, the hydrocarbon-based liquid can be efficiently partially oxidized to the active reducing agent including the oxygen-containing hydrocarbon such as aldehyde.

According to the exhaust gas purifier of the eighth aspect of the present invention, the third selective reduction catalyst including the noble metal-based catalyst is provided in the exhaust pipe on the exhaust gas downstream side of the second selective reduction catalyst. Therefore, when the hydrocarbon-based liquid is injected from a liquid injection nozzle in a low temperature region of the exhaust gas, the residue of the hydrocarbon-based liquid consumed as the reducing agent by the first and second selective reduction catalysts reacts with NOx in the exhaust gas on the noble metal-based third selective reduction catalyst capable of exhibiting the performance for reducing NOx in the exhaust gas. As a result, the NOx is rapidly reduced on the third selective reduction catalyst, and therefore, NOx can be efficiently decreased in a low temperature region of the exhaust gas.

According to the exhaust gas purifier of the twelfth aspect of the present invention, by using the silver-based catalyst to which palladium is added as the first selective reduction catalyst, the performance of decreasing NOx in the exhaust gas at the relatively low temperature of the exhaust gas temperature can be enhanced as compared with the case where a silver-based catalyst to which palladium is not added.

DESCRIPTION OF EMBODIMENTS

Next, embodiments of the present invention will be described based on the accompanying drawings.

First Embodiment

Figure 1:
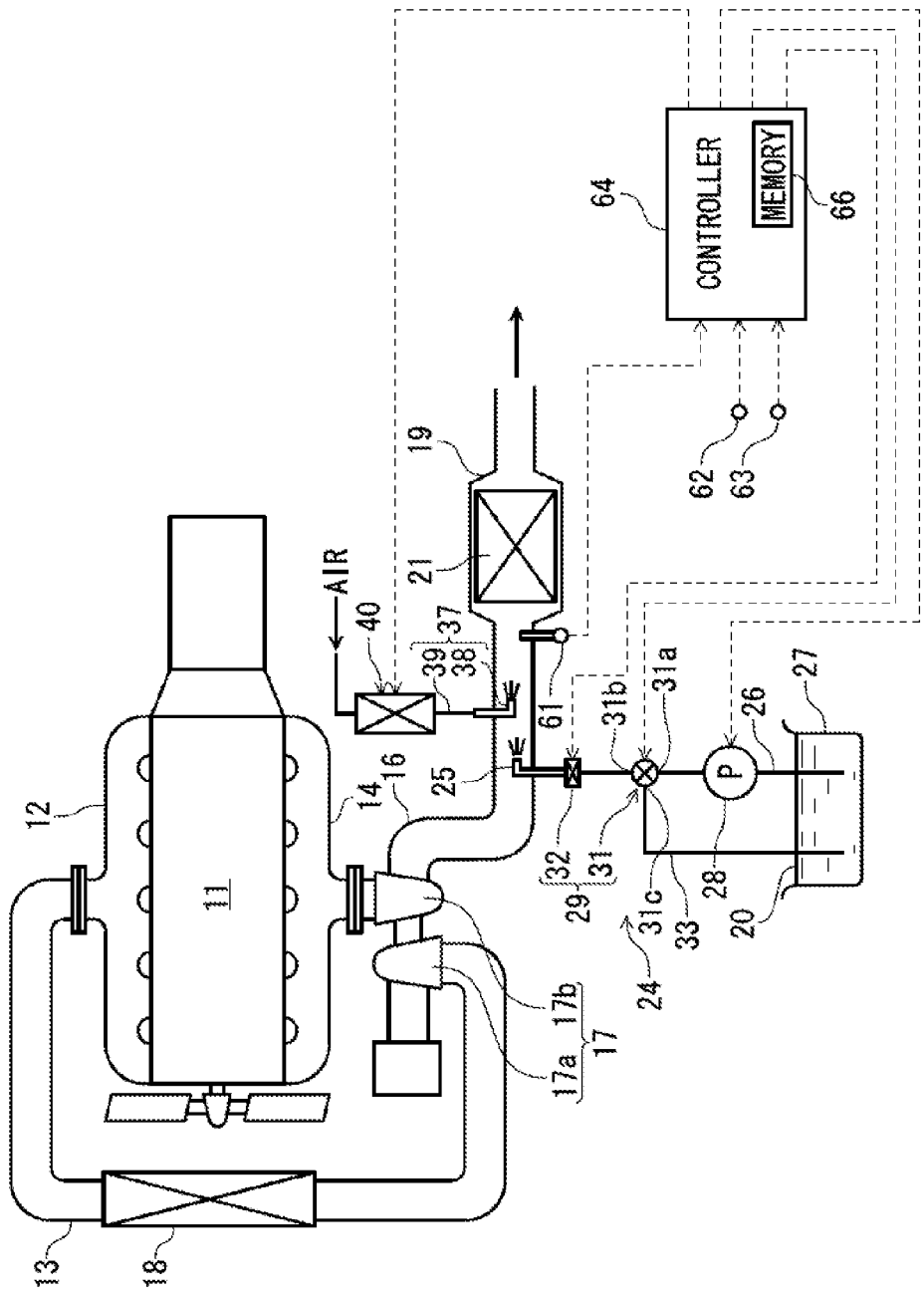
FIG. 1 is a configuration diagram showing an exhaust gas purifier of a first embodiment of the present invention.

As shown in FIG. 1, an air intake pipe 13 is connected to an air intake port of an engine 11 via an air intake manifold 12, and an exhaust pipe 16 is connected to an exhaust port of the engine 11 via an exhaust manifold 14. The air intake pipe 13 is provided with a compressor housing 17a of a turbo supercharger 17 and an inter cooler 18 that cools the intake air compressed by the turbo supercharger 17, and the exhaust pipe 16 is provided with a turbine housing 17b of the turbo supercharger 17. A compressor blade (not shown) is rotatably housed in the compressor housing 17a, and a turbine blade (not shown) is rotatably housed in the turbine housing 17b. The compressor blade and the turbine blade are connected to each other by a shaft (not shown), energy of an exhaust gas discharged from the engine 11 rotates the turbine blade and the compressor blade via the shaft, and the intake air within the air intake pipe is compressed by means of rotation of this compressor blade.

A first selective reduction catalyst 21 including a silver-based catalyst is provided in the exhaust pipe 16. The first selective reduction catalyst 21 is housed in a casing 19 having a larger diameter than the exhaust pipe 16. The first selective reduction catalyst 21 is a monolith catalyst and is configured by coating a cordierite honeycomb carrier with silver zeolite or silver alumina. Specifically, the first selective reduction catalyst 21 including silver zeolite is configured by coating a honeycomb carrier with a slurry containing a zeolite powder having been ion-exchanged with silver. Also, the first selective reduction catalyst 21 including silver alumina is configured by coating a honeycomb carrier with a slurry containing a γ-alumina powder or θ-alumina powder having silver supported thereon. It is noted that in this embodiment, while the silver-based catalyst is used as the first selective reduction catalyst, a silver-based catalyst having palladium added thereto may be used. That is, the first selective reduction catalyst including a silver-based catalyst having palladium added thereto is a monolith catalyst and is configured by coating a cordierite honeycomb carrier with silver zeolite or silver alumina to which palladium is added. Specifically, the first selective reduction catalyst including silver zeolite to which palladium is added is configured by coating a honeycomb carrier with a slurry containing a zeolite powder having been ion-exchanged with silver and palladium. Also, the first selective reduction catalyst including silver alumina having palladium added thereto is configured by coating a honeycomb carrier with a slurry containing a γ-alumina powder or θ-alumina powder having silver and palladium supported thereon. By using a silver-based catalyst having palladium added thereto as the first selective reduction catalyst, a performance of decreasing NOx in an exhaust gas at a relatively low temperature of the exhaust gas temperature can be enhanced as compared with the case where a silver-based catalyst is used to which palladium is not added.

Meanwhile, the exhaust pipe 16 on an exhaust gas upstream side of the first selective reduction catalyst 21 is connected to a hydrocarbon-based liquid supply device 24 that injects (supplies) a hydrocarbon-based liquid 20 to this exhaust pipe 16. The hydrocarbon-based liquid supply device 24 includes a liquid injection nozzle 25 extending to the inside of the exhaust pipe 16 on the exhaust gas upstream side of the first selective reduction catalyst 21, a liquid supply pipe 26 having a tip end which is connected to the liquid injection nozzle 25, a liquid tank 27 that is connected to a base end of this liquid supply pipe 26 and that stores the hydrocarbon-based liquid 20, a liquid pump 28 that forcedly supplies the hydrocarbon-based liquid 20 within this liquid tank 27 to the liquid injection nozzle 25, and a liquid supply amount regulation valve 29 that regulates a supply amount (injection amount) of the hydrocarbon-based liquid 20 which is injected from the liquid injection nozzle 25. In this embodiment, light oil that is fuel of the diesel engine 11 is used as the above-described hydrocarbon-based liquid 20. Thereby, the liquid tank 27, which stores the hydrocarbon-based liquid 20, can also serve as a fuel tank of the engine 11. Also, the above-described liquid pump 28 is provided in the liquid supply pipe 26 between the liquid injection nozzle 25 and the liquid tank 27, and the liquid supply amount regulation valve 29 is provided in the liquid supply pipe 26 between the liquid injection nozzle 25 and the liquid pump 28. Furthermore, the liquid supply amount regulation valve 29 includes a liquid pressure regulation valve 31 that is provided in the liquid supply pipe 26 and that regulates a supply pressure of the hydrocarbon-based liquid 20 to the liquid injection nozzle 25 and a liquid on-off valve 32 that is provided at the base end of the liquid injection nozzle 25 and that opens and closes the base end of the liquid injection nozzle 25.

The liquid pressure regulation valve 31 is a three-way valve having first to third ports 31a to 31c. The first port 31a is connected to a discharge port of the liquid pump 28, the second port 31b is connected to the liquid on-off valve 32, and the third port 31c is connected to the liquid tank 27 via a return pipe 33. When the liquid pressure regulation valve 31 is driven, the liquid-based liquid 20 forcedly supplied from the liquid pump 28 flows from the first port 31a into the liquid pressure regulation valve 31, and after being regulated to a predetermined pressure by this liquid pressure regulation valve 31, the liquid-based liquid 20 is forcedly supplied from the second port 31b into the liquid on-off valve 32. Also, when the driving of the liquid pressure regulation valve 31 is stopped, the hydrocarbon-based liquid 20 forcedly supplied by the liquid pump 28 flows from the first port 31a into the liquid pressure regulation valve 31, and thereafter, the liquid-based liquid 20 goes through the return pipe 33 from the third port 31c and is returned to the liquid tank 27.

Meanwhile, an ozone generation device 40 that generates ozone is connected to the exhaust pipe 16 on the exhaust gas upstream of the first selective reduction catalyst 21 and on a exhaust gas downstream side of the liquid injection nozzle 25 via an ozone supply device 37 (FIG. 1). The ozone supply device 37 includes an ozone injection nozzle 38 extending to the exhaust pipe 16 on the exhaust gas upstream side of the first selective reduction catalyst 21 and on the exhaust gas downstream side of the liquid injection nozzle 25, and an ozone supply pipe 39 having a tip end that is connected to the ozone injection nozzle 38 and a base end that is connected to the ozone generation device 40. It is noted that in this embodiment, although the ozone generation device is connected to the exhaust pipe on the exhaust gas upstream side of the first selective reduction catalyst and on the exhaust gas downstream side of the liquid injection nozzle via the ozone supply device, the ozone generation device may be connected to the exhaust pipe on the exhaust gas upstream side of the first selective reduction catalyst and on the exhaust gas upstream side of the liquid injection nozzle via the ozone supply device.

Figure 2:
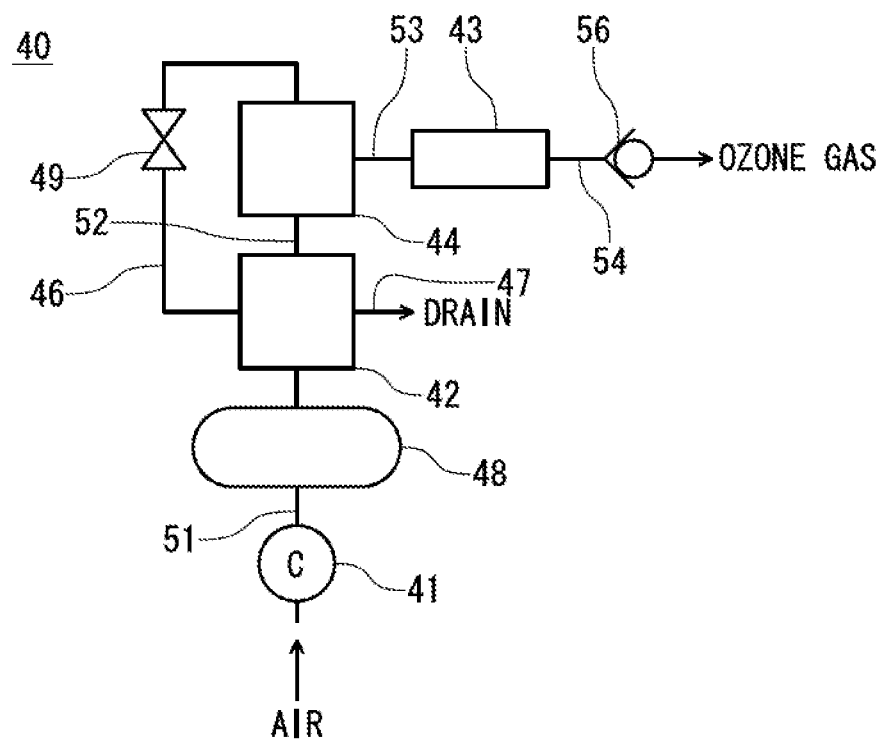
FIG. 2 is an air circuit configuration diagram of an ozone generation device that is used in the exhaust gas purifier.
Figure 3:
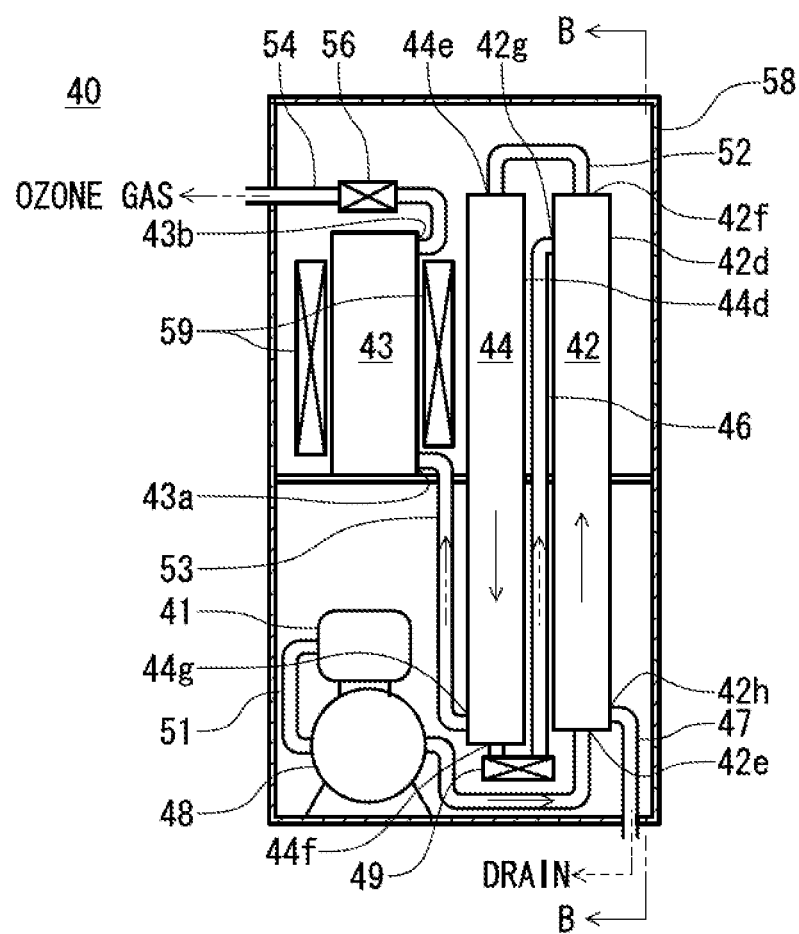
FIG. 3 is a section view showing the ozone generation device taken along an A-A line in FIG. 4.
Figure 4:
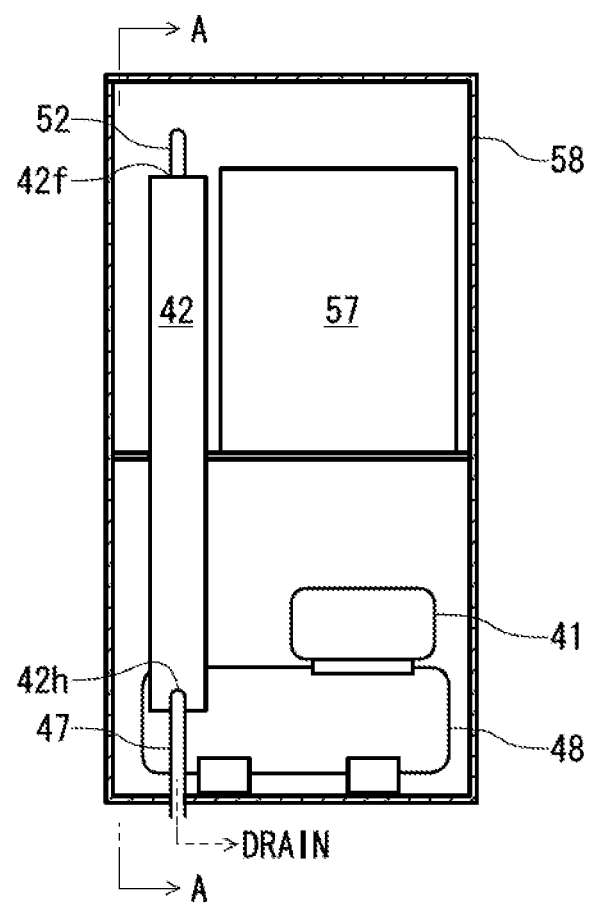
FIG. 4 is a section view showing the ozone generation device take along a B-B line in FIG. 3.

As shown in FIGS. 2 to 4, the above-described ozone generation device 40 includes a compressor 41 that compresses air in the atmosphere, a dryer 42 that dries the compressed air compressed by this compressor 41, and an ozone generator 43 that converts a part of oxygen in the compressed air dried by this dryer 42 into ozone. In this embodiment, the compressor 41 is configured to be driven by a battery having a direct current voltage of 24 V. It is noted that in this embodiment, while the compressor is driven by the battery having the direct current voltage of 24 V, the compressor may be driven by a crankshaft of the engine, or so far as a hybrid vehicle is concerned, it may be driven by a battery having a direct current voltage of from 200 to 300 V.

Figure 5:
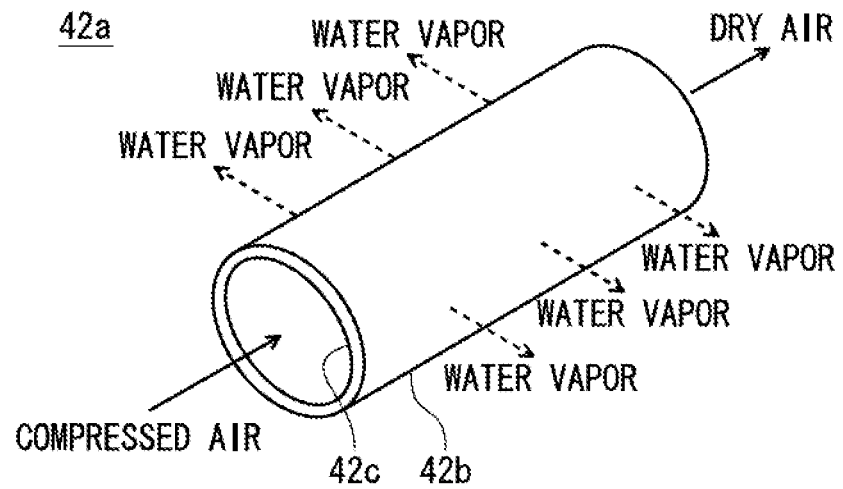
FIG. 5 is a main portion enlarged section view of a hollow fiber constituting a water vapor separation membrane of a dryer.

The dryer 42 is configured so that a water vapor separation membrane 42a (FIG. 5) through which a water vapor (moisture) easily permeates and air hardly permeates is housed in a cylindrical housing 42d. This water vapor separation membrane 42a is, for example, formed by bundling aromatic polyimide asymmetric hollow fibers 42b (the hollow fiber 42b has a through hole 42c which is formed in the center thereof and has an asymmetric coarse-dense structure in the membrane thickness direction) having a membrane thickness of 100 μm, an outer diameter of 500 μm, and a length of 450 mm. The water vapor separation membrane 42a extends in a longitudinal direction of the housing 42d and is housed in the housing 42d (FIGS. 2 to 4). Also, an air inlet 42e that introduces the air compressed by the compressor 41 is formed on the bottom of the housing 42d, and an air outlet 42f that discharges the compressed air dried by the dryer 42 is formed on the top of the housing 42d (FIG. 3). The air inlet 42e is connected to a lower end of the respective hollow fibers 42b of the water vapor separation membrane 42a, and the air outlet 42f is connected to an upper end of the respective hollow fibers 42b of the water vapor separation membrane 42a, whereby the air inlet 42e and the air outlet 42f are communicated with and connected to the through hole 42c of the respective hollow fibers 42b. Furthermore, a purge gas inlet 42g that introduces a nitrogen-rich gas which serves as a purge gas and which will be described later is formed in an upper part of the side wall of the housing 42d, and a purge gas outlet 42h that discharges the nitrogen-rich gas, which serves the purge gas, together with a water vapor (moisture) is formed in a lower part of the side wall of the housing 42d. Then, the configuration is made such that the nitrogen-rich gas introduced from the purge gas inlet 42g passes through the outer periphery of the hollow fiber 42b of the water vapor separation membrane 42a and is discharged from the purge gas outlet 42h.

Here, when the compressed air containing a water vapor (moisture) flows within the through hole 42c (the through hole 42c is, for example, formed to have an inner diameter of 300 μm) of each hollow fiber 42b of the water vapor separation membrane 42a, the water vapor in the compressed air flowing through the through hole 42c permeates from the inner surface side of the membrane of the hollow fiber 42b with a higher water vapor partial pressure into the outer surface side of the membrane of the hollow fiber 42b with a lower water vapor partial pressure while utilizing a difference in water vapor partial pressure present on the inner surface side and the outer surface side of the membrane of the hollow fiber 42b. Therefore, the water vapor in the compressed air flowing through the through hole 42c of the hollow fiber 42b decreases, and the dried compressed air is discharged from the air outlet 42f.

In this embodiment, a silent discharge type ozone generation device is used as the ozone generator 43 (FIGS. 2 and 3). Specifically, while illustration is omitted, the ozone generator 43 is configured so that a high-frequency high voltage is applied between a pair of electrodes which are arranged in parallel to each other with a predetermined gap, and one or both of which are covered by a dielectric, to thereby generate plasma discharge, and a part of oxygen contained in the air is converted into ozone by means of this plasma discharge.

Figure 6:
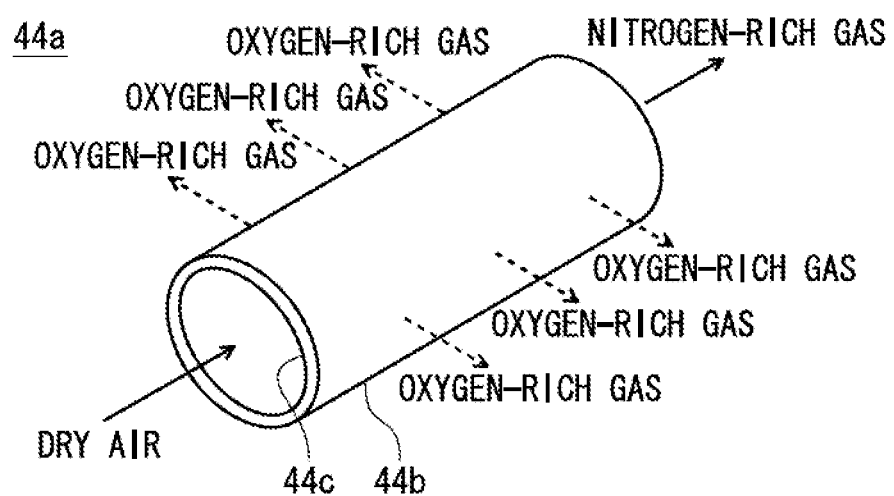
FIG. 6 is a main portion enlarged section view of a hollow fiber constituting an oxygen enrichment membrane of an air separator.

Meanwhile, an air separator 44 is provided between the dryer 42 and the ozone generator 43 (FIGS. 2 and 3). This air separator 44 is configured so that an oxygen enrichment membrane 44a (FIG. 6) having such properties that an oxygen gas more easily permeates therethrough than a nitrogen gas in the air is housed in a cylindrical housing 44d. The oxygen enrichment membrane 44a is configured so as to separate the compressed air dried by the dryer 42 into an oxygen-rich gas having a high oxygen concentration and a nitrogen-rich gas having a high nitrogen concentration. Specifically, the oxygen enrichment membrane 44a is formed by bundling hollow fibers 44b, each of which has a polymer selectively allowing an oxygen gas to more permeate therethrough than a nitrogen gas and in which a through hole 44c is formed in the center thereof, and the oxygen enrichment membrane 44a extends in the longitudinal direction of the housing 44d and is housed in the housing 44d. Also, the hollow fibers 44b constituting the oxygen enrichment membrane 44a are preferably made of a glassy polymer having a large degree of separation between an oxygen gas and a nitrogen gas, and more preferably made of a polyimide having an especially large degree of separation between an oxygen gas and a nitrogen gas and having excellent mechanical strength, heat resistance, and durability, and so on. In addition, the membrane of the hollow fiber 44b constituting the oxygen enrichment membrane 44a may be a homogeneous membrane having a uniform density in the membrane thickness direction, or a composite membrane which is formed so that the density in the membrane thickness direction is not uniform by inserting plural hollow fibers having different inner diameter, outer diameter, and density may also be used. However, it is preferable to use an asymmetric membrane having a large permeation rate by allowing it to have an asymmetric coarse-dense structure in the membrane thickness direction. Furthermore, it is preferable that the membrane thickness of the hollow fiber 44b is in a range of from 10 μm to 500 μm and that the outer diameter of the hollow fiber 44b is in a range of from 50 μm to 2000 μm.

A dry air inlet 44e that introduces the compressed air dried by the dryer 42 is formed on the top of the housing 44d, which houses the oxygen enrichment membrane 44a, and a nitrogen-rich gas outlet 44f that discharges the nitrogen-rich gas separated by the air separator 44 is formed on the bottom of the housing 44d (FIG. 3). The dry air inlet 44e is connected to an upper end of each hollow fiber 44b of the oxygen enrichment membrane 44a, and the nitrogen-rich gas outlet 44f is connected to a lower end of each hollow fiber 44b of the oxygen enrichment membrane 44a, whereby the dry air inlet 44e and the nitrogen-rich gas outlet 44f are communicated with and connected to the through hole 44c of each hollow fiber 44b. Also, an oxygen-rich gas outlet 44g that discharges the oxygen-rich gas is formed on a lower part of the side wall of the housing 44d, which houses the oxygen enrichment membrane 44a. The configuration is made such that the oxygen-rich gas whose oxygen concentration has become high by passage through the membrane of the hollow fibers 44b of the oxygen enrichment membrane 44a is discharged from the oxygen-rich gas outlet 44g.

Here, a principle of separating the dried compressed air into an oxygen-rich gas having a high oxygen concentration and a nitrogen-rich gas having a high nitrogen concentration by the oxygen enrichment membrane 44a will be described. When the dried compressed air flows through the through hole 44c of each hollow fiber 44b of the oxygen enrichment membrane 44a, the membrane of the hollow fibers 44b causes thermal vibration to form gaps through which the gas passes, and therefore, oxygen molecules and nitrogen molecules in the compressed air are taken into the above-described gaps. At that time, the thickness of the oxygen enrichment membrane 44a is formed relatively thin, and a ratio of the oxygen molecules to permeate through the membrane of the hollow fibers 44b is 2.5 times as large as that of the nitrogen molecule to permeate through the membrane of the hollow fibers 44b. Therefore, the oxygen molecule rapidly permeates from the inner surface side of the membrane of the hollow fibers 44b at which a partial pressure is high into the outer surface side of the membrane of the hollow fibers 44b at which the partial pressure is low. Thereby, the oxygen concentration on the outer surface side of the membrane of the hollow fibers 44b becomes high, whereas the oxygen concentration on the inner surface side of the membrane of the hollow fibers 44b becomes low. As a result, the oxygen-rich gas is generated by passage of the compressed air through the oxygen enrichment membrane 44a, and the nitrogen-rich gas is generated from the compressed air without passing through the oxygen enrichment membrane 44a. It is noted that the gaps formed in the membrane of the hollow fibers 44b by means of the above-described thermal vibration are about 5 nm in size.

Meanwhile, the discharge port of the compressor 41 is connected to the air inlet 42e of the dryer 42 by a first supply pipe 51, and the air outlet 42f of the dryer 42 is connected to the dry air inlet 44e of the air separator 44 by a second supply pipe 52 (FIGS. 2 to 4). Also, the oxygen-rich gas outlet 44g of the air separator 44 is connected to an oxygen-rich gas inlet 43a of the ozone generator 43 by a third supply pipe 53, and one end of a fourth supply pipe 54 is connected to an ozone outlet 43b of the ozone generator 43. Also, the nitrogen-rich gas outlet 44f of the air separator 44 is connected to the purge gas inlet 42g of the dryer 42 by a purge pipe 46, and one end of a drain pipe 47 is connected to the purge gas outlet 42h of the dryer 42. Furthermore, an air tank 48 that stores the compressed air compressed by the compressor 41 is provided in the first supply pipe 51, and a flow rate regulation valve 49 that regulates the flow rate of the nitrogen-rich gas passing through the purge pipe 46 is provided in the purge pipe 46. The above-described air tank 48 is provided for the purposes of supplying a sufficient amount of compressed air into the air separator 44 and relieving a pressure change of the compressed air even if the flow rates of the oxygen-rich gas and the nitrogen-rich gas abruptly change. It is noted that in FIGS. 2 and 3, a reference sign 56 indicates a check valve provided in the fourth supply pipe 54. The configuration is made such that this check valve 56 allows ozone to flow from the ozone generator 43 into an ozone injection nozzle 38 which will be described later and inhibits flowing of the ozone or exhaust gas from the ozone injection nozzle 38 into the ozone generator 43. Also, in FIG. 4, a reference sign 57 indicates a high-voltage power source device that supplies an electric power to the ozone generator 43, and in FIGS. 3 and 4, a reference sign 58 indicates a casing that houses the respective members of the ozone generation device 40. Furthermore, in FIG. 3, reference signs 59, 59 indicate fans that cool the ozone generator 43.

Referring back to FIG. 1, a temperature sensor 61 that detects a temperature of the exhaust gas immediately before flowing into the first selective reduction catalyst 21 is provided in the exhaust pipe 16 on the exhaust gas upstream side of the first selective reduction catalyst 21 and on the exhaust gas downstream side of the liquid injection nozzle 25. Also, a revolution speed of the engine 11 is detected by a rotation sensor 62, and a load of the engine 11 is detected by a load sensor 63. Each of detection outputs of the temperature sensor 61, the rotation sensor 62, and the load sensor 63 is connected to a control input of a controller 64, and control outputs of the controller 64 are connected to the high-voltage power source device 57, the flow rate regulation valve 49, the ozone generator 43, the liquid pump 28, the liquid pressure regulation valve 31, and the liquid on-off valve 32, respectively. A memory 66 is provided in the controller 64. The memory 66 stores, in advance as a map, presence or absence of actuation of the compressor 41, an opening degree of the flow rate regulation valve 49, presence or absence of actuation of the ozone generator 43 to be driven by the high-voltage power source device 57, presence or absence of actuation of the liquid pump 28, an opening degree of the liquid pressure regulation valve 31, and the number of times the liquid on-off valve 32 opens and closes per unit time in association with the revolution speed of the engine, the load of the engine, and the exhaust gas temperature at the inlet of the first selective reduction catalyst 21.

The operation of the thus configured exhaust gas purifier will be described. When the engine 11 is started and the exhaust gas temperature becomes relatively high and reaches 200° C. or higher, based on each of the detection outlets of the temperature sensor 61, the rotation sensor 62, and the load sensor 63, the controller 64 drives the compressor 41 of the ozone generation device 40, opens the flow rate regulation valve 49 at a predetermined opening degree, actuates the ozone generator 43 by the high-voltage power source device 57, drives the liquid pump 28 of the hydrocarbon-based liquid supply device 24, opens the liquid pressure regulation valve 31 at a predetermined opening degree, and opens and closes the liquid on-off valve 32. When the compressor 41 of the ozone generation device 40 is driven, the air is compressed and stored in the air tank 48. This compressed air is dried upon removal of a water vapor (moisture) by the dryer 42, and this dried compressed air is separated into an oxygen-rich gas having a high oxygen concentration and a nitrogen-rich gas having a high nitrogen concentration by the air separator 44. The oxygen-rich gas separated by the air separator 44 is supplied to the ozone generator 43, a part of oxygen in the oxygen-rich gas is converted into ozone by the ozone generator 43, and this ozone passes through the fourth supply pipe 54 and the ozone supply pipe 39 and is supplied to the ozone injection nozzle 38. Meanwhile, the nitrogen-rich gas separated by the air separator 44 passes through the purge pipe 46 and is supplied to the dryer 42 and is then discharged from the drain pipe 47 together with a water vapor (moisture) separated by the dryer 42. In this way, since the dryer 42 is regenerated by using the nitrogen-rich gas, which is unnecessary for generating ozone, without using an oxygen-rich gas which is necessary for generating ozone, the dryer 42 can be efficiently regenerated. Also, since the air compressed by the compressor 41 may not be used directly for the purpose of regenerating the dryer 42, a consumption amount of air compressed by the compressor 41 can be suppressed. As a result, since the discharge capacity of the compressor 41 can be decreased, it is possible to achieve downsizing of the compressor 41.

Also, when the oxygen-rich gas increases, the water vapor amount (moisture amount) in the compressed air to be removed by the dryer 42 also increases. However, in that case, since the opening degree of the flow rate regulation valve 49 is made large, the nitrogen-rich gas which is separated by the air separator 44 also increases. Therefore, the increased water vapor (moisture) within the dryer 42 can be removed by this increased nitrogen-rich gas. As a result, even if the oxygen-rich gas increases or decreases, the nitrogen-rich gas increases or decreases following this increase or decrease of the oxygen-rich gas, and therefore, the dryer 42 can be efficiently regenerated. Also, since a regulator that regulates the pressure of the compressed air compressed by the compressor 41 is not be used, the ozone generation device 40 can be configured of a relatively small number of components. Also, since the passage resistance of the compressed air can be decreased, the compressor 41 can be made smaller. Also, even if a hydrocarbon is present in the compressed air compressed by the compressor 41 and this hydrocarbon attaches or does not attach to the oxygen enrichment membrane 44a, the oxygen-rich gas and the nitrogen-rich gas can be surely separated from each other by the oxygen enrichment membrane 44a. As a result, regardless of whether or not a hydrocarbon attaches to the oxygen enrichment membrane 44a, a separation performance of the oxygen enrichment membrane 44a between the oxygen-rich gas and the nitrogen-rich gas is not lowered.

Meanwhile, the ozone supplied to the ozone injection nozzle 38 is injected (supplied) from the ozone injection nozzle 38 to the exhaust pipe 16. Then, a part of NO in the exhaust gas is oxidized with this ozone to $NO_2$ as expressed by the following formula (1). When the exhaust gas temperature is in a range of from 200 to 250° C., this $NO_2$ has such properties that in the first selective reduction catalyst 21, its reactivity with the NOx reducing agent (a gasified hydrocarbon-based liquid or an active reducing agent including an oxygen-containing hydrocarbon containing either or both of aldehyde or alcohol which will be described later) becomes high.

(1)

Also, when the liquid pump 28 is driven, when the liquid pressure regulation valve 31 is opened at a predetermined opening degree, and when the liquid on-off valve 32 is opened and closed, the hydrocarbon-based liquid 20 passes through the liquid supply pipe 26 and is intermittently injected (supplied) into the exhaust pipe 16. This hydrocarbon-based liquid 20 supplied to the exhaust pipe 16 is partially oxidized to the active reducing agent including the an oxygen-containing hydrocarbon containing either or both of aldehyde or alcohol with ozone which is generated by the ozone generation device 40 and supplied to the exhaust pipe 16 by the ozone supply device 37. When the exhaust gas temperature is in a range of from 250 to 500° C., this active reducing agent has a function to enhance the reactivity as a NOx reducing agent for reducing NOx (NO and $NO_2$) in the exhaust gas to $N_2$ in the first selective reduction catalyst 21. Here, examples of the aldehyde include acetaldehyde, formaldehyde, and the like, and examples of the alcohol include methyl alcohol, ethyl alcohol, and the like. It is noted that an oxygen atom in ozone has high reactivity, and therefore, in the case where it reacts with a saturated hydrocarbon-based liquid such as light oil, etc., an oxygen-containing hydrocarbon such as a partially oxidized material of hydrocarbon (aldehyde, alcohol, etc.), etc. is generated.

If the exhaust gas temperature is within the range of from 200 to 250° C., the controller 64 controls the compressor 41, the flow rate regulation valve 49, and the high-voltage power source device 57 of the ozone generation device 40, respectively, to thereby supply a relatively small amount of ozone to the exhaust pipe 16. Also, the controller 64 controls the liquid pressure regulation valve 31 and the liquid on-off valve 32 of the hydrocarbon-based liquid supply device 24, respectively, to thereby supply a relatively small amount of the hydrocarbon-based liquid 20 to the exhaust pipe 16. When NOx in which a part of NO has been oxidized to $NO_2$ with ozone, the relatively small amount of gasified hydrocarbon-based liquid, and the relatively small amount of active reducing agent including the oxygen-containing hydrocarbon such as aldehyde which has been partially oxidized with ozone are supplied to the first selective reduction catalyst 21, $NO_2$ in NOx relatively actively reacts with the NOx reducing agent (the gasified hydrocarbon-based liquid or the active reducing agent including the oxygen-containing hydrocarbon such as aldehyde) and is reduced to $N_2$.

If the exhaust gas temperature increases in the range of from 200 to 250° C., the controller 64 controls the compressor 41, the flow rate regulation valve 49, and the high-voltage power source device 57 of the ozone generation device 40, respectively, to thereby increase the supply amount of ozone to the exhaust pipe 16. Also, the controller 64 controls the liquid pressure regulation valve 31 and the liquid on-off valve 32 of the hydrocarbon-based liquid supply device 24, respectively, to thereby increase the supply amount of hydrocarbon-based liquid 20 to the exhaust pipe 16. When NOx containing $NO_2$, the amount of which has been increased by the increase of the ozone supply amount, a relatively small amount of the gasified hydrocarbon-based liquid, and the active reducing agent including the oxygen-containing hydrocarbon such as aldehyde, the amount of which has been increased by the increase of the ozone supply amount, are supplied to the first selective reduction catalyst 21, $NO_2$ in NOx actively reacts with the NOx reducing agent (the gasified hydrocarbon-based liquid or the active reducing agent including the oxygen-containing hydrocarbon such as aldehyde) and is reduced to $N_2$, and a decrease rate of NOx in the exhaust gas is abruptly enhanced with an increase of the exhaust gas temperature.

If the exhaust gas temperature is in the range of from 250 to 500° C., the controller 64 controls the compressor 41, the flow rate regulation valve 49, and the high-voltage power source device 57 of the ozone generation device 40, respectively, to thereby slightly decrease the supply amount of ozone to the exhaust pipe 16 as compared with the case where the exhaust gas temperature is in the range of from 200 to 250° C. Also, the controller 64 controls the liquid pressure regulation valve 31 and the liquid on-off valve 32 of the hydrocarbon-based liquid supply device 24, respectively, to thereby make the supply amount of hydrocarbon-based liquid 20 to the exhaust pipe 16 be substantially equal to that in the case where the exhaust gas temperature is in the range of from 200 to 250° C. (it should be noted that its supply amount is changed according to the exhaust gas flow rate). Here, the reason why the supply amount of ozone to the exhaust pipe 16 is slightly decreased is that if the exhaust gas temperature becomes high as in the range of from 250 to 500° C., ozone is susceptible to thermal decomposition, and therefore, even if ozone is supplied to the exhaust pipe 16 at a high temperature, a part of NO in the exhaust gas is hardly oxidized to $NO_2$ with ozone and the hydrocarbon-based liquid 20 is hardly partially oxidized to the active reducing agent including the oxygen-containing hydrocarbon such as aldehyde, etc. with ozone. When NOx slightly containing $NO_2$ obtained by oxidation of a part of NO with ozone, the slight amount of the active reducing agent including an oxygen-containing hydrocarbon such as aldehyde, and the relatively large amount of the gasified hydrocarbon-based liquid without being partially oxidized to the active reducing agent including the slight amount of the oxygen-containing hydrocarbon such as aldehyde with ozone are supplied to the first selective reduction catalyst 21, $NO_2$ in NOx reacts with the NOx reducing agent (the gasified hydrocarbon-based liquid or the active reducing agent including the oxygen-containing hydrocarbon such as aldehyde) and is reduced to $N_2$. However, a decrease rate of NOx in the exhaust gas gradually decreases with an increase of the exhaust gas temperature. As a result, NOx in the exhaust gas can be relatively efficiently decreased over a wide range of exhaust gas temperatures from 200 to 500° C.

Second Embodiment

Figure 7:
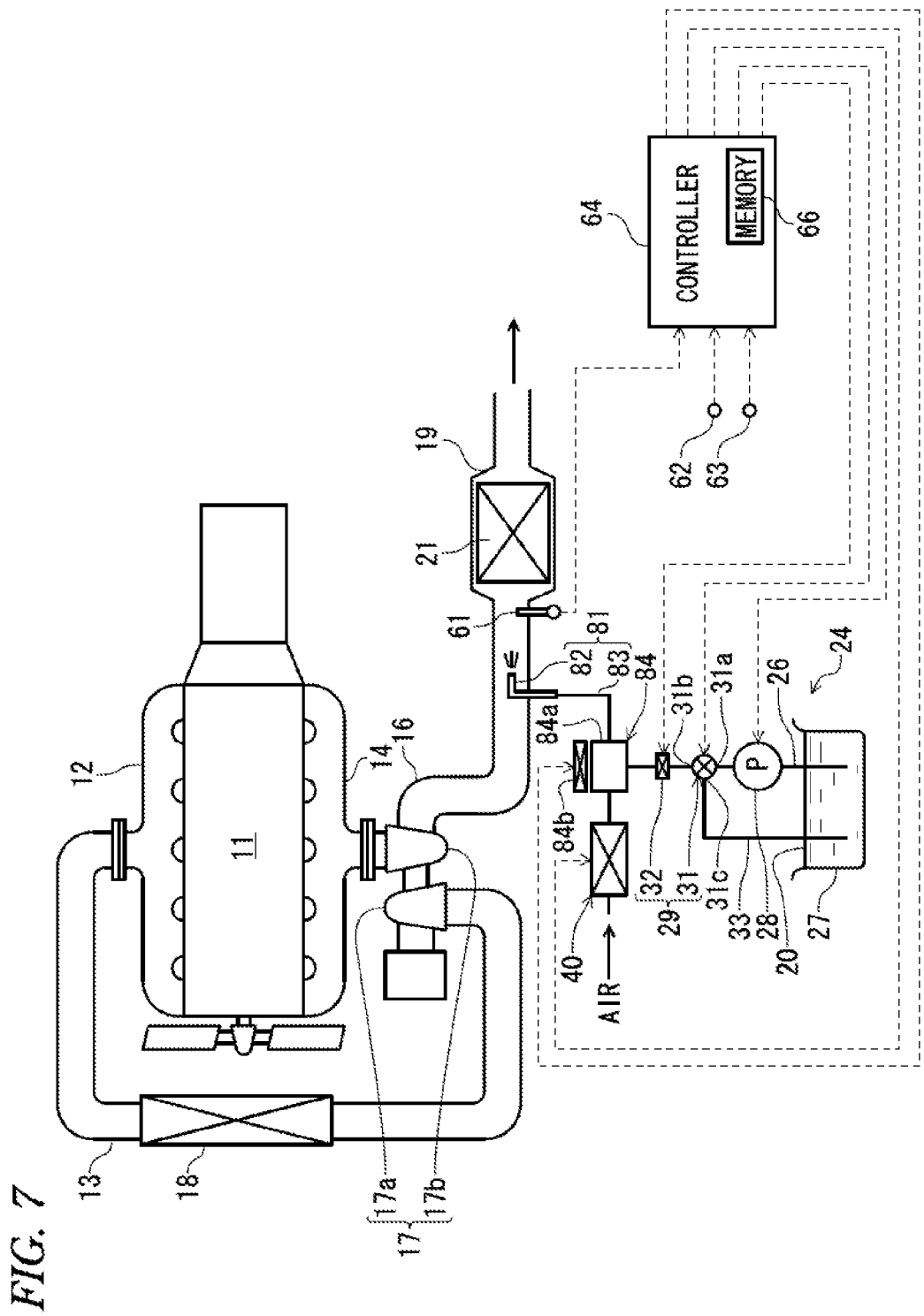
FIG. 7 is a configuration diagram showing an exhaust gas purifier of a second embodiment of the present invention.

FIG. 7 shows a second embodiment of the present invention. In FIG. 7, the same reference signs as those in FIG. 1 indicate the same components. In this embodiment, the ozone generation device 40 is connected to the exhaust pipe 16 on the exhaust gas upstream side of the first selective reduction catalyst 21 via a gas supply device 81. The gas supply device 81 includes a gas injection nozzle 82 that extends into the exhaust pipe 16 on the exhaust gas upstream side of the first selective reduction catalyst 21, and a gas supply pipe 83 having a tip end connected to the gas injection nozzle 82 and a base end connected to the ozone generation device 40. Also, the hydrocarbon-based liquid supply device 24 is connected to an intermediate portion of the gas supply device 81. That is, a tip end of the liquid supply pipe 26 for the hydrocarbon-based liquid 20 is connected to an intermediate portion of the gas supply pipe 83. Furthermore, a mixing chamber 84 is provided in a connection portion between the hydrocarbon-based liquid supply device 24 and the gas supply device 81. That is, the mixing chamber 84 is provided in a connection portion between the liquid supply pipe 26 and the gas supply pipe 83. This mixing chamber 84 includes a box 84a having a mixer built therein, and a heater 84b that is provided on an outer surface of this box 84a and that heats the inside of the box 84a to about 250° C. With this configuration, ozone and the hydrocarbon-based liquid can be efficiently mixed. Except what is described above, the configuration is the same as that in the first embodiment.

The operation of the thus configured exhaust gas purifier will be described. If the exhaust gas temperature is in a range of from 200 to 250° C., the controller 64 controls the compressor, the flow rate regulation valve, and the high-voltage power source device of the ozone generation device 40, respectively, to thereby supply a relatively small amount of ozone to the mixing chamber 84. Also, the controller 64 controls the liquid pressure regulation valve 31 and the liquid on-off valve 32 of the hydrocarbon-based liquid supply device 24, respectively, to thereby supply a relatively small amount of the hydrocarbon-based liquid 20 to the mixing chamber 84. At that time, the hydrocarbon-based liquid 20 is gasified by the heater 84b of the mixing chamber 84. When ozone and the hydrocarbon-based liquid 20 are mixed in the mixing chamber 84, the hydrocarbon-based liquid 20 is efficiently partially oxidized to an active reducing agent including an oxygen-containing hydrocarbon such as aldehyde. with a part of ozone. At that time, since ozone with a high concentration and the hydrocarbon-based liquid 20 with a high concentration can be mixed in the mixing chamber 84, reaction between ozone and the hydrocarbon-based liquid 20 becomes fast, whereby the partial oxidation of the hydrocarbon-based liquid 20 to the active reducing agent with ozone can be promoted. This partially oxidized active reducing agent including the oxygen-containing hydrocarbon such as aldehyde passes through the gas supply pipe 83 and is supplied to the exhaust pipe 16. Also, of ozone supplied to the mixing chamber 84, the remaining ozone which are not used for the partial oxidation of the above-described hydrocarbon-based liquid 20 to the active reducing agent is supplied to the exhaust pipe 16 as it is, and a part of NO in the exhaust gas flowing through the exhaust pipe 16 is oxidized to $NO_2$ with this ozone. When NOx in which the part of NO has been oxidized to $NO_2$ with ozone and a relatively small amount of the active reducing agent including the oxygen-containing hydrocarbon such as aldehyde, which has been partially oxidized with ozone, are supplied to the first selective reduction catalyst 21, $NO_2$ in NOx relatively actively reacts with the NOx reducing agent (the active reducing agent including the oxygen-containing hydrocarbon such as aldehyde) and is reduced to $N_2$.

If the exhaust gas temperature increases in the range of from 200 to 250° C., the controller 64 controls the compressor, the flow rate regulation valve, and the high-voltage power source device of the ozone generation device 40, respectively, to thereby increase the supply amount of ozone to the mixing chamber 84. Also, the controller 64 controls the liquid pressure regulation valve 31 and the liquid on-off valve 32 of the hydrocarbon-based liquid supply device 24, respectively, to thereby increase the supply amount of hydrocarbon-based liquid 20 to the mixing chamber 84. When ozone and the hydrocarbon-based liquid 20 are mixed in the mixing chamber 84, the amount of active reducing agent including the oxygen-containing hydrocarbon such as aldehyde, which is obtained by partial oxidation of the hydrocarbon-based liquid 20 with a part of increased ozone, increases. Also, of ozone supplied to the mixing chamber 84, the remaining ozone which is not used for the partial oxidation of the above-described hydrocarbon-based liquid 20 to the active reducing agent also increases, and the amount of $NO_2$ obtained by oxidation of a part of NO in the exhaust gas flowing through the exhaust pipe 16 with this ozone increases as well. When NOx containing $NO_2$, the amount of which has been increased, and the active reducing agent including the oxygen-containing hydrocarbon such as aldehyde, the amount of which has been increased, are supplied to the first selective reduction catalyst 21, $NO_2$ in NOx actively reacts with the NOx reducing agent (the active reducing agent including the oxygen-containing hydrocarbon such as aldehyde) and is reduced to $N_2$, and a decrease rate of NOx in the exhaust gas is abruptly enhanced with an increase of the exhaust gas temperature.

If the exhaust gas temperature is in the range of from 250 to 500° C., the controller 64 controls the compressor, the flow rate regulation valve, and the high-voltage power source device of the ozone generation device 40, respectively, to thereby slightly decrease the supply amount of ozone to the exhaust pipe 16 as compared with the case where the exhaust gas temperature is in the range of from 200 to 250° C. Also, the controller 64 controls the liquid pressure regulation valve 31 and the liquid on-off valve 32 of the hydrocarbon-based liquid supply device 24, respectively, to thereby make the supply amount of hydrocarbon-based liquid 20 to the exhaust pipe 16 be substantially equal to that in the case where the exhaust gas temperature is in the range of from 200 to 250° C. (it should be noted that its supply amount is changed according to the exhaust gas flow rate). Here, the reason why the supply amount of ozone to the exhaust pipe 16 is slightly decreased is that when the exhaust gas temperature becomes as high as from 250 to 500° C., ozone is susceptible to thermal decomposition, and therefore, even if ozone is supplied to the exhaust pipe 16 at a high temperature, a part of NO in the exhaust gas is hardly oxidized to $NO_2$ with ozone.

Also, even if the exhaust gas temperature becomes high, ozone and the hydrocarbon-based liquid 20 are mixed in the mixing chamber 84 of the gas supply device 81 at a relatively low temperature, and therefore, the hydrocarbon-based liquid can be partially oxidized to the active reducing agent including the oxygen-containing hydrocarbon such as aldehyde with ozone. Furthermore, even if the active reducing agent including the oxygen-containing hydrocarbon such as aldehyde is supplied to the exhaust pipe 16 at a high temperature, it is not thermally decomposed. If NOx slightly containing $NO_2$ obtained by oxidation of a part of NO with ozone and the active reducing agent including the oxygen-containing hydrocarbon such as aldehyde in an amount substantially equal to that in the case where the exhaust gas temperature is in the range of from 200 to 250° C. are supplied to the first selective reduction catalyst 21, $NO_2$ in NOx actively reacts with the NOx reducing agent (the active reducing agent including the oxygen-containing hydrocarbon such as aldehyde) and is reduced to $N_2$, and even if the exhaust gas temperature increases, a decrease rate of NOx in the exhaust gas is kept in a relatively high level. As a result, NOx in the exhaust gas can be more efficiently decreased over a wide range of exhaust gas temperatures from 200 to 500° C. The operations other than those described above are substantially the same as the operations in the first embodiment, and therefore, redundant description thereof will be omitted.

Third Embodiment

Figure 8:
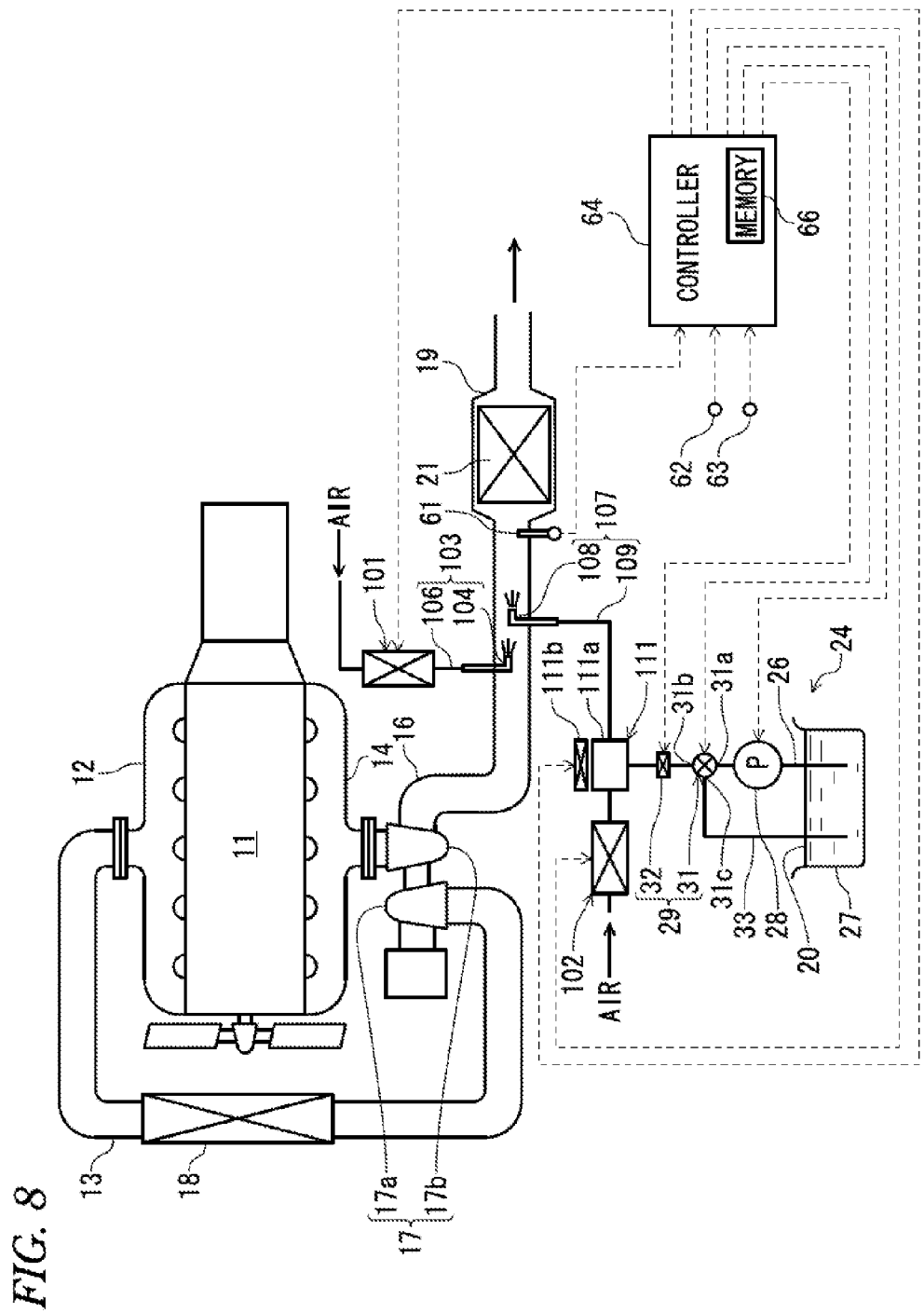
FIG. 8 is a configuration diagram showing an exhaust gas purifier of a third embodiment of the present invention.

FIG. 8 shows a third embodiment of the present invention. In FIG. 8, the same reference signs as those in FIG. 7 indicate the same components. In this embodiment, the ozone generation device includes a first ozone generation device 101 and a second ozone generation device 102. The configuration of each of the first ozone generation device 101 and the second ozone generation device 102 is the same as that of the ozone generation device of the first embodiment. The first ozone generation device 101 is connected to the exhaust pipe 16 on the exhaust gas upstream side of the first selective reduction catalyst 21 via an ozone supply device 103. The ozone supply device 103 includes an ozone injection nozzle 104 that extends into the exhaust pipe 16 on the exhaust gas upstream side of the first selective reduction catalyst 21, and an ozone supply pipe 106 having a tip end connected to the ozone injection nozzle 104 and a base end connected to the first ozone generation device 101. Also, the second ozone generation device 102 is connected, via a gas supply device 107, to the exhaust pipe 16 on the exhaust gas upstream side of the first selective reduction catalyst 21 and on the exhaust gas downstream side of the ozone injection nozzle 104. The gas supply device 107 includes a gas injection nozzle 108 extending into the exhaust pipe 16 on the exhaust gas upstream side of the first selective reduction catalyst 21 and on the exhaust gas downstream side of the ozone injection nozzle 104, and a gas supply pipe 109 having a tip end connected to the gas injection nozzle 108 and a base end connected to the second ozone generation device 102. It is noted that in this embodiment, while the second ozone generation device is connected, via the gas supply device, to the exhaust pipe on the exhaust gas upstream side of the first selective reduction catalyst and on the exhaust gas downstream side of the ozone injection nozzle, the second ozone generation device may be connected, via the gas supply device, to the exhaust gas on the exhaust gas upstream side of the first selective reduction catalyst and on the exhaust gas upstream side of the ozone injection nozzle.

Also, the hydrocarbon-based liquid supply device 24 is connected to an intermediate portion of the gas supply device 107. That is, a tip end of the liquid supply pipe 26 is connected on an intermediate portion of the gas supply pipe 109. Furthermore, a mixing chamber 111 is provided in a connection portion between the hydrocarbon-based liquid supply device 24 and the gas supply device 107. That is, the mixing chamber 111 is provided in a connection portion between the liquid supply pipe 26 and the gas supply pipe 109. This mixing chamber 111 has a box 111a having a mixer built therein, and a heater 111b that is provided on an outer surface of this box 111a and that heats the inside of the box 111a to about 250° C. With this configuration, ozone and a hydrocarbon-based liquid can be efficiently mixed. It is noted that in this embodiment, while two ozone generation devices of the first and second ozone generation devices are provided, a single ozone generation device may be provided and ozone generated by this ozone generation device is switched in a predetermined ratio between ozone to be directly supplied to the exhaust pipe and ozone to be supplied to the mixing chamber. Except for what is described above, the configuration is the same as that in the first embodiment.

The operation of the thus configured exhaust gas purifier will be described. If the exhaust gas temperature is in the range of from 200 to 250° C., the controller 64 controls the compressor, the flow rate regulation valve, and the high-voltage power source device of the first ozone generation device 101, respectively, to thereby supply a relatively small amount of ozone to the exhaust pipe 16. Also, ozone is not supplied to the mixing chamber 111 by keeping the compressor, the flow rate regulation valve, and the high-voltage power source device of the second ozone generation device 102 are in a halt state. Furthermore, the controller 64 controls the liquid pressure regulation valve 31 and the liquid on-off valve 32 of the hydrocarbon-based liquid supply device 24, respectively, to thereby supply a relatively small amount of the hydrocarbon-based liquid 20 to the mixing chamber 111. At that time, the hydrocarbon-based liquid 20 is gasified by the heater 111b of the mixing chamber 111. Since ozone is not supplied to the inside of the mixing chamber 111, the gasified hydrocarbon-based liquid 20 passes through the gas supply pipe 26 and is supplied directly to the exhaust pipe 16. When ozone generated by the first ozone generation device 101 passes through the ozone supply pipe 106 and is supplied to the exhaust pipe 16, a part of NO in the exhaust gas flowing through the exhaust pipe 16 is oxidized to $NO_2$ with this ozone. When NOx in which a part of NO has been oxidized to $NO_2$ with ozone and a relatively small amount of the gasified hydrocarbon-based liquid are supplied to the first selective reduction catalyst 21, $NO_2$ in NOx relatively actively reacts with the NOx reducing agent (the gasified hydrocarbon-based liquid) and is reduced to $N_2$.

If the exhaust gas temperature increases in the range of from 200 to 250° C., the controller 64 controls the compressor, the flow rate regulation valve, and the high-voltage power source device of the first ozone generation device 101, respectively, to thereby increase the supply amount of ozone to the exhaust pipe 16. Also, the controller 64 controls the compressor, the flow rate regulation valve, and the high-voltage power source device of the second ozone generation device 102, respectively, to thereby supply a relatively large amount of ozone to the mixing chamber 111. Furthermore, the controller 64 controls the liquid pressure regulation valve 31 and the liquid on-off valve 32 of the hydrocarbon-based liquid supply device 24, respectively, to thereby increase the supply amount of hydrocarbon-based liquid 20 to the mixing chamber 111. When ozone and the hydrocarbon-based liquid 20 are mixed in the mixing chamber 111, the hydrocarbon-based liquid 20 is efficiently partially oxidized to the active reducing agent including the oxygen-containing hydrocarbon such as aldehyde, with ozone the amount of which has been increased. At that time, since ozone with a high concentration and the hydrocarbon-based liquid 20 with a high concentration can be mixed in the mixing chamber 111, the reaction between ozone and the hydrocarbon-based liquid 20 becomes fast, whereby the partial oxidation of the hydrocarbon-based liquid 20 to the active reducing agent with ozone can be promoted. This partially oxidized active reducing agent including the oxygen-containing hydrocarbon such as aldehyde passes through the gas supply pipe 109 and is supplied to the exhaust pipe 16. When NOx containing $NO_2$, the amount of which has been increased, and a relatively large amount of active reducing agent including the oxygen-containing hydrocarbon such as aldehyde are supplied to the first selective reduction catalyst 21, $NO_2$ in NOx actively reacts with the NOx reducing agent (the active reducing agent including the oxygen-containing hydrocarbon such as aldehyde) and is reduced to $N_2$, and a decrease rate of NOx in the exhaust gas is abruptly enhanced with an increase of the exhaust gas temperature.

If the exhaust gas temperature is in the range of from 250 to 500° C., the controllers 64 stops the compressor, the flow rate regulation valve, and the high-voltage power source device of the first ozone generation device 101, respectively, to thereby stop the supply of ozone to the exhaust pipe 16. Also, the controller 64 controls the liquid pressure regulation valve 31 and the liquid on-off valve 32 of the hydrocarbon-based liquid supply device 24, respectively, to thereby make the supply amount of hydrocarbon-based liquid 20 to the mixing chamber 111 be substantially equal to that in the case where the exhaust gas temperature is in the range of from 200 to 250° C. (it should be noted that its supply amount is changed according to the exhaust gas flow rate). Here, the reason why the supply of ozone generated by the first ozone generation device 101 to the exhaust pipe 16 is stopped is that if the exhaust gas temperature becomes as high as from 250 to 500° C., ozone is susceptible to thermal decomposition, and therefore, even if ozone is supplied to the exhaust pipe 16 at a high temperature, a part of NO in the exhaust gas is hardly oxidized to $NO_2$ with ozone.

Also, even if the exhaust gas temperature becomes high, ozone and the hydrocarbon-based liquid 20 are mixed in the mixing chamber 111 of the gas supply device 107 at a relatively low temperature, and therefore, the hydrocarbon-based liquid can be partially oxidized with ozone to the active reducing agent including the oxygen-containing hydrocarbon such as aldehyde. Furthermore, even if active reducing agent including the oxygen-containing hydrocarbon such as aldehyde is supplied to the exhaust pipe 16 at a high temperature, it is not thermally decomposed. If NOx which does not contain at all $NO_2$ which is obtained by oxidation of a part of NO with ozone and the active reducing agent including the oxygen-containing hydrocarbon such as aldehyde, in an amount substantially equal to that in the case where the exhaust gas temperature is in the range of from 200 to 250° C. are supplied to the first selective reduction catalyst 21, NOx actively reacts with the NOx reducing agent (the active reducing agent including the oxygen-containing hydrocarbon such as aldehyde,) and is reduced to $N_2$, and even if the exhaust gas temperature increases, a decrease rate of NOx in the exhaust gas is kept in a high level. As a result, NOx in the exhaust gas can be more efficiently decreased over a wide range of exhaust gas temperatures from 200 to 500° C.

Fourth Embodiment

Figure 9:
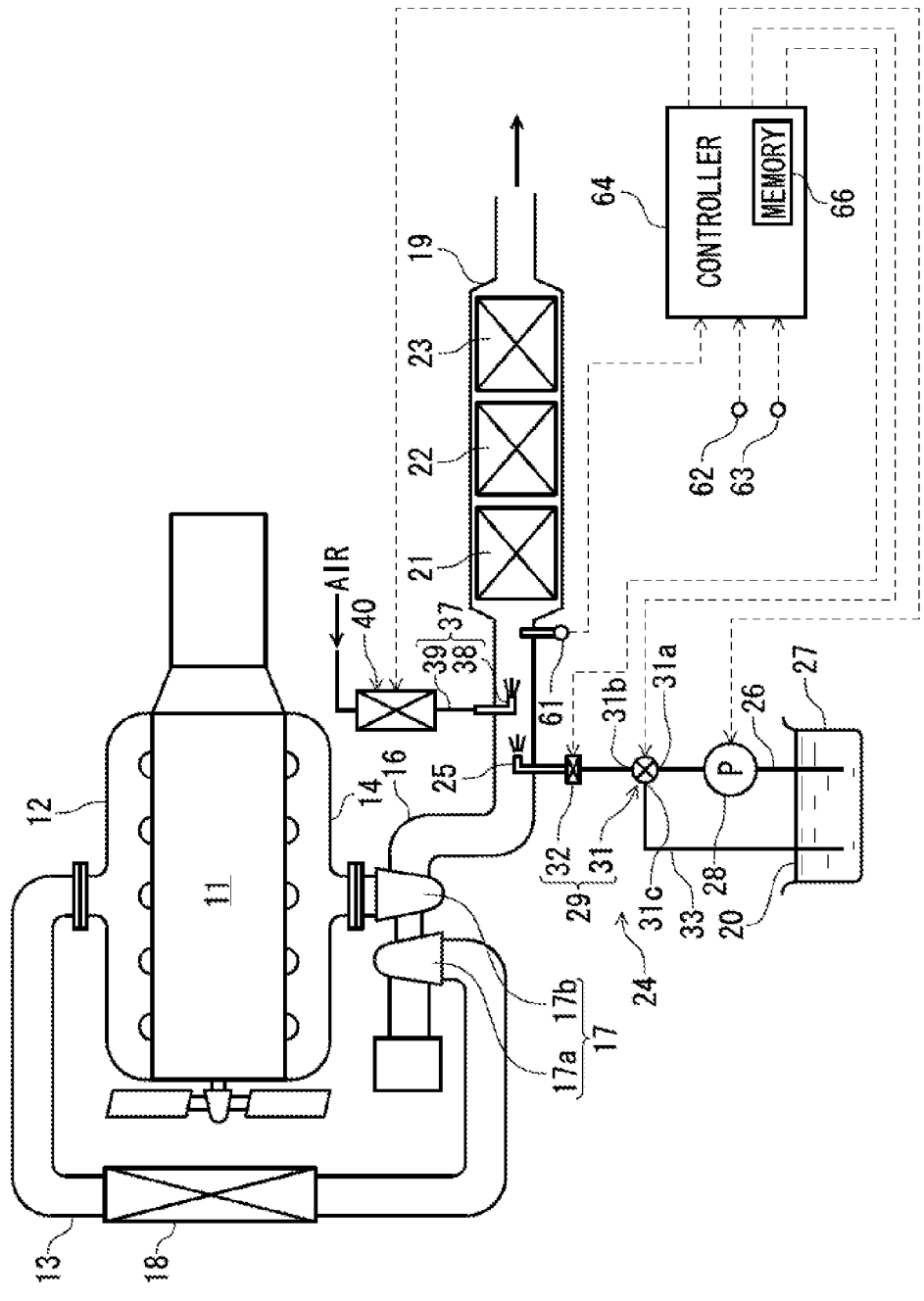
FIG. 9 is a configuration diagram showing an exhaust gas purifier of a fourth embodiment of the present invention.

FIG. 9 shows a fourth embodiment of the present invention. In FIG. 9, the same reference signs as those in FIG. 1 indicate the same components. In this embodiment, a second selective reduction catalyst 22 including a copper-based catalyst, an iron-based catalyst, or a vanadium-based catalyst is housed in the casing 19 on the exhaust gas downstream side of the first selective reduction catalyst 21. The second selective reduction catalyst 22 is a monolith catalyst and is configured by coating a cordierite honeycomb carrier with a copper zeolite, an iron zeolite, or a vanadium-based oxide. Specifically, the second selective reduction catalyst 22 including the copper zeolite is configured by coating a honeycomb carrier with a slurry containing a zeolite powder having been ion-exchanged with copper. Also, the second selective reduction catalyst 22 including the iron zeolite is configured by coating a honeycomb carrier with a slurry containing a zeolite powder having been ion-exchanged with iron. Furthermore, the second selective reduction catalyst 22 including the vanadium-based oxide is configured by coating a honeycomb carrier with a slurry only containing a powder of vanadium oxide or containing a mixed oxide powder containing titanium oxide and tungsten oxide in addition to vanadium oxide.

A third selective reduction catalyst 23 including a noble metal-based catalyst is housed in the casing 19 on the exhaust gas downstream side of the second selective reduction catalyst 22. The third selective reduction catalyst 23 is a monolith catalyst and is configured by coating a cordierite honeycomb carrier with a noble metal such as platinum zeolite, platinum alumina, platinum zeolite having palladium added thereto, or platinum alumina having palladium added thereto. Specifically, the third selective reduction catalyst 23 including the platinum zeolite is configured by coating a honeycomb carrier with a slurry containing a zeolite powder having been ion-exchanged with platinum. Also, the third selective reduction catalyst 23 including the platinum alumina is configured by coating a honeycomb carrier with a slurry containing a γ-alumina powder or θ-alumina powder having platinum supported thereon. Also, the third selective reduction catalyst 23 including the platinum zeolite having palladium added thereto is configured by coating a honeycomb carrier with a slurry containing a zeolite powder having been ion-exchanged with platinum and palladium. Furthermore, the third selective reduction catalyst 23 including the platinum alumina having palladium added thereto is configured by coating a honeycomb carrier with a slurry containing a γ-alumina powder or θ-alumina powder having platinum and palladium supported thereon. Except what is described above, the configuration is the same as that in the first embodiment.

The operation of the thus configured exhaust gas purifier will be described. When the engine 11 is started and the exhaust gas temperature is in the range of from 150 to 200° C., based on the respective detection outlets of the temperature sensor 61, the rotation sensor 62, and the load sensor 63, the controller 64 actuates the liquid pump 28 of the hydrocarbon-based liquid supply device 24, opens the liquid pressure regulation valve 31 at a predetermined opening degree, and opens and closes the liquid on-off valve 32, to thereby intermittently inject a relatively small amount of the hydrocarbon-based liquid 20 from the liquid injection nozzle 25. Although the hydrocarbon-based liquid 20 injected from the liquid injection nozzle 25 is gasified and flows into the first selective reduction catalyst 21, NOx in the exhaust gas less exhibits a reducing performance on the first selective reduction catalyst 21 in a low temperature region of the exhaust gas. Therefore, the consumption of the hydrocarbon-based liquid in the first selective reduction catalyst 21 is small, and most of the gasified hydrocarbon-based liquid passes through the first selective reduction catalyst 21 and flows into the second selective reduction catalyst 22. NOx in the exhaust gas also less exhibits the reducing performance on the second selective reduction catalyst 22 in a low temperature region of the exhaust gas. Therefore, the consumption of the hydrocarbon-based liquid in the second selective reduction catalyst 22 is small, and most of the gasified hydrocarbon-based liquid passes through the second selective reduction catalyst 22 and flows into the third selective reduction catalyst 23. Almost all of the hydrocarbon-based liquid injected from the above-described liquid injection nozzle 25 is gasified and flows into the third selective reduction catalyst 23. This third selective reduction catalyst 23 causes NOx to largely exhibit the reducing performance in a low temperature region of the exhaust gas, and therefore, the above-described gasified hydrocarbon-based liquid reacts with NOx in the exhaust gas on the third selective reduction catalyst 23, and NOx is rapidly reduced. As a result, NOx is efficiently decreased in the low temperature region of the exhaust gas.

If the exhaust gas temperature reaches 200° C. or higher, based on the respective detection outlets of the temperature sensor 61, the rotation sensor 62, and the load sensor 63, the controller 64 drives the compressor 41 of the ozone generation device 40, opens the flow rate regulation valve 49 at a predetermined opening degree, actuates the ozone generator 43 by the high-voltage power source device 57, drives the liquid pump 28 of the hydrocarbon-based liquid supply device 24, opens the liquid pressure regulation valve 31 at a predetermined opening degree, and opens and closes the liquid on-off valve 32. The operations of the ozone generation device 40 are substantially the same as those of the ozone generation device of the first embodiment, and therefore, redundant description thereof will be omitted. Ozone generated by the above-described ozone generation device 40 is supplied to the ozone injection nozzle 38.

The ozone supplied to the ozone injection nozzle 38 is injected (supplied) from the ozone injection nozzle 38 to the exhaust pipe 16. Then, a part of NO in the exhaust gas is oxidized with this ozone as expressed by the following formula (1). When the exhaust gas temperature is in a range of from 200 to 250° C., this $NO_2$ has such properties that in the first selective reduction catalyst 21, its reactivity with the NOx reducing agent (a gasified hydrocarbon-based liquid or an active reducing agent including an oxygen-containing hydrocarbon containing either or both of aldehyde or alcohol which will be described later) becomes high.

$$O_3 + NO \rightarrow O_2 + NO_2 \qquad (1)$$

Also, when the liquid pump 28 is driven, when the liquid pressure regulation valve 31 is opened at a predetermined opening degree, and when the liquid on-off valve 32 is opened and closed, the hydrocarbon-based liquid 20 passes through the liquid supply pipe 26 and is intermittently injected (supplied) into the exhaust pipe 16. This hydrocarbon-based liquid 20 supplied to the exhaust pipe 16 is partially oxidized to the active reducing agent including the oxygen-containing hydrocarbon containing either or both of aldehyde or alcohol with ozone which is generated by the ozone generation device 40 and supplied to the exhaust pipe 16 by the ozone supply device 37. When the exhaust gas temperature is in a range of from 250 to 500° C., this active reducing agent has a function to enhance the reactivity as a NOx reducing agent for reducing NOx (NO and $NO_2$) in the exhaust gas to $N_2$ in the first selective reduction catalyst 21. Here, examples of the aldehyde include acetaldehyde, formaldehyde, and the like, and examples of the alcohol include methyl alcohol, ethyl alcohol, and the like. It is noted that an oxygen atom in ozone has high reactivity, and therefore, in the case where it reacts with a saturated hydrocarbon-based liquid such as light oil, etc., an oxygen-containing hydrocarbon such as a partially oxidized material of hydrocarbon (aldehyde, alcohol, etc.), etc. is generated.

If the exhaust gas temperature is within the range of from 200 to 250° C., the controller 64 controls the compressor 41, the flow rate regulation valve 49, and the high-voltage power source device 57 of the ozone generation device 40, respectively, to thereby supply a relatively small amount of ozone to the exhaust pipe 16. Also, the controller 64 controls the liquid pressure regulation valve 31 and the liquid on-off valve 32 of the hydrocarbon-based liquid supply device 24, respectively, to thereby supply a relatively small amount of the hydrocarbon-based liquid 20 to the exhaust pipe 16. When NOx in which a part of NO has been oxidized to $NO_2$ with ozone, the relatively small amount of gasified hydrocarbon-based liquid, and the relatively small amount of active reducing agent including the oxygen-containing hydrocarbon such as aldehyde which has been partially oxidized with ozone are supplied to the first selective reduction catalyst 21, $NO_2$ in NOx relatively actively reacts with the NOx reducing agent (the gasified hydrocarbon-based liquid or the active reducing agent including the oxygen-containing hydrocarbon such as aldehyde) and is reduced to $N_2$.

If the exhaust gas temperature increases is in the range of from 200 to 250° C., the controller 64 controls the compressor 41, the flow rate regulation valve 49, and the high-voltage power source device 57 of the ozone generation device 40, respectively, to thereby increase the supply amount of ozone to the exhaust pipe 16. Also, the controller 64 controls the liquid pressure regulation valve 31 and the liquid on-off valve 32 of the hydrocarbon-based liquid supply device 24, respectively, to thereby increase the supply amount of hydrocarbon-based liquid 20 to the exhaust pipe 16. When NOx containing $NO_2$, the amount of which has been increased by the increase of the ozone supply amount, a relatively small amount of the gasified hydrocarbon-based liquid, and the active reducing agent including the oxygen-containing hydrocarbon such as aldehyde, the amount of which has been increased by the increase of the ozone supply amount, are supplied to the first selective reduction catalyst 21, $NO_2$ in NOx actively reacts with the NOx reducing agent (the gasified hydrocarbon-based liquid or the active reducing agent including the oxygen-containing hydrocarbon such as aldehyde) and is reduced to $N_2$, and a decrease rate of NOx in the exhaust gas is abruptly enhanced with an increase of the exhaust gas temperature.

If the exhaust gas temperature is in the range of from 250 to 500° C., the controller 64 controls the compressor 41, the flow rate regulation valve 49, and the high-voltage power source device 57 of the ozone generation device 40, respectively, to thereby slightly decrease the supply amount of ozone to the exhaust pipe 16 as compared with the case where the exhaust gas temperature is in the range of from 200 to 250° C. Also, the controller 64 controls the liquid pressure regulation valve 31 and the liquid on-off valve 32 of the hydrocarbon-based liquid supply device 24, respectively, to thereby make the supply amount of hydrocarbon-based liquid 20 to the exhaust pipe 16 be substantially equal to that in the case where the exhaust gas temperature is in the range of from 200 to 250° C. (it should be noted that its supply amount is changed according to the exhaust gas flow rate). Here, the reason why the supply amount of ozone to the exhaust pipe 16 is slightly decreased is that if the exhaust gas temperature becomes high as in the range of from 250 to 500° C., ozone is susceptible to thermal decomposition, and therefore, even if ozone is supplied to the exhaust pipe 16 at a high temperature, a part of NO in the exhaust gas is hardly oxidized to $NO_2$ with ozone and the hydrocarbon-based liquid 20 is hardly partially oxidized to the active reducing agent including the oxygen-containing hydrocarbon such as aldehyde, etc. with ozone. When NOx slightly containing $NO_2$ obtained by oxidation of a part of NO with ozone, the slight amount of the active reducing agent including an oxygen-containing hydrocarbon such as aldehyde, and the relatively large amount of the gasified hydrocarbon-based liquid without being partially oxidized to the active reducing agent including the slight amount of the oxygen-containing hydrocarbon such as aldehyde with ozone are supplied to the first selective reduction catalyst 21, $NO_2$ in NOx reacts with the NOx reducing agent (the gasified hydrocarbon-based liquid or the active reducing agent including the oxygen-containing hydrocarbon such as aldehyde) and is reduced to $N_2$. However, a decrease rate of NOx in the exhaust gas gradually decreases with an increase of the exhaust gas temperature.

However, if the exhaust gas temperature is in the range of from 250 to 500° C. and a surplus gasified hydrocarbon-based liquid flows into the silver-based first selective reduction catalyst 21, ammonia is generated on this catalyst 21. It is presumed that an HC component (alkane) constituting the hydrocarbon-based liquid 20 such as light oil adsorbs onto the first selective reduction catalyst 21, that NOx and oxygen react with each other on the first selective reduction catalyst 21 to produce a reaction intermediate such as isocyanate species (N=C=O, C=N), and that when water is added to this reaction intermediate, ammonia is generated. When the exhaust gas containing ammonia generated by the first selective reduction catalyst 21 flows into the copper-based, iron-based, or vanadium-based second selective reduction catalyst 22, NOx (NO and $NO_2$) in the exhaust gas reacts with ammonia on the second selective reduction catalyst 22 and is reduced to $N_2$ as expressed by the following formulae (2) to (4).

$$NO+NO_2+2NH_3 \rightarrow 2N_2+3H_2O \tag{2}$$

$$4NO+4NH_3+O_2 \rightarrow 4N_2+6H_2O \tag{3}$$

$$6NO_2+8NH_3 \rightarrow 7N_2+12H_2O \tag{4}$$

As a result, NOx in the exhaust gas can be relatively efficiently decreased over a wide range of exhaust gas temperatures from 150 to 500° C.

Fifth Embodiment

Figure 10:
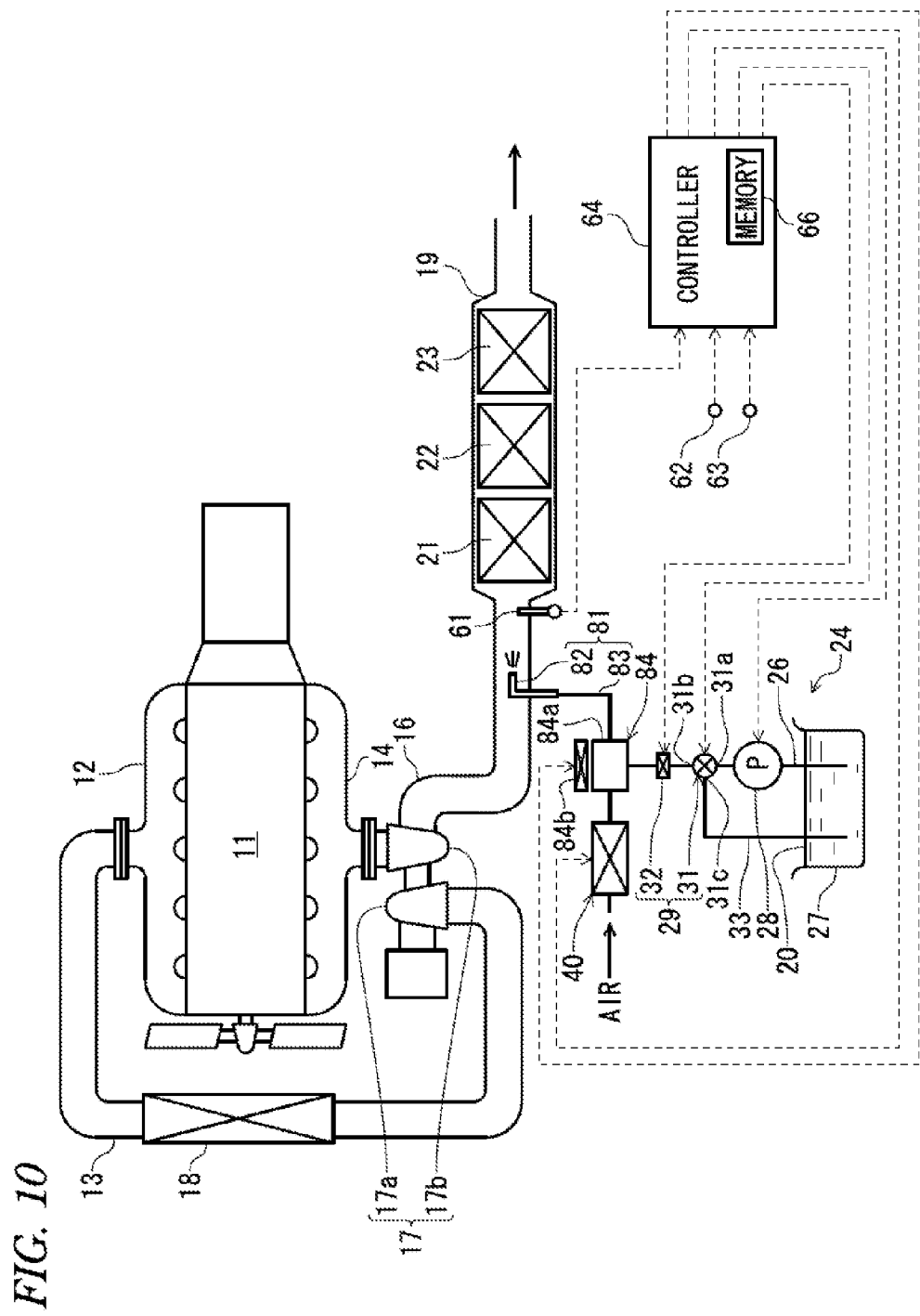
FIG. 10 is a configuration diagram showing an exhaust gas purifier of a fifth embodiment of the present invention.

FIG. 10 shows a fifth embodiment of the present invention. In FIG. 10, the same reference signs as those in FIG. 9 indicate the same components. In this embodiment, the ozone generation device 40 is connected to the exhaust pipe 16 on the exhaust gas upstream side of the first selective reduction catalyst 21 via a gas supply device 81. The gas supply device 81 includes a gas injection nozzle 82 extending into the exhaust pipe 16 on the exhaust gas upstream side of the first selective reduction catalyst 21, and a gas supply pipe 83 having a tip end connected to the gas injection nozzle 82 and a base end connected to the ozone generation device 40. Also, the hydrocarbon-based liquid supply device 24 is connected to an intermediate portion of the gas supply device 81. That is, a tip end of the liquid supply pipe 26 of the hydrocarbon-based liquid 20 is connected to an intermediate portion of the gas supply pipe 83. Furthermore, a mixing chamber 84 is provided in a connection portion between the hydrocarbon-based liquid supply device 24 and the gas supply device 81. That is, the mixing chamber 84 is provided in a connection portion between the liquid supply pipe 26 and the gas supply pipe 83. This mixing chamber 84 includes a box 84a having a mixer built therein, and a heater 84b that is provided on the outer surface of this box 84a and that heats the inside of the box 84a to about 250° C. With this configuration, ozone and a hydrocarbon-based liquid can be efficiently mixed. Except what is described above, the configuration is the same as that in the fourth embodiment.

The operation of the thus configured exhaust gas purifier will be described. Similarly to the above-described fourth embodiment, when the exhaust gas temperature is in the range of from 150 to 200° C. and the hydrocarbon-based liquid 20 is injected from the liquid injection nozzle 25, even if the hydrocarbon-based liquid 20 does not react with the first and second selective reduction catalysts 21 and 22, the hydrocarbon-based liquid 20 reacts with NOx in the exhaust gas on the noble metal-based third selective reduction catalyst 23, which can cause NOx in the exhaust gas to exhibit the reducing performance, and NOx is rapidly reduced on the third selective reduction catalyst 23. Therefore, NOx can be efficiently decreased in a low temperature region of the exhaust gas.

If the exhaust gas temperature is in the range of from 200 to 250° C., the controller 64 controls the compressor, the flow rate regulation valve, and the high-voltage power source device of the ozone generation device 40, respectively, to thereby supply a relatively small amount of ozone to the mixing chamber 84. Also, the controller 64 controls the liquid pressure regulation valve 31 and the liquid on-off valve 32 of the hydrocarbon-based liquid supply device 24, respectively, to thereby supply a relatively small amount of the hydrocarbon-based liquid 20 to the mixing chamber 84. At that time, the hydrocarbon-based liquid 20 is gasified by the heater 84b of the mixing chamber 84. When ozone and the hydrocarbon-based liquid 20 are mixed in the mixing chamber 84, the hydrocarbon-based liquid 20 is efficiently partially oxidized, with a part of ozone, to the active reducing agent such as aldehyde. At that time, since ozone with a high concentration and the hydrocarbon-based liquid 20 with a high concentration can be mixed in the mixing chamber 84, the reaction between ozone and the hydrocarbon-based liquid 20 becomes fast, whereby the partial oxidation of the hydrocarbon-based liquid 20 to the active reducing agent with ozone can be promoted. This partially oxidized active reducing agent including the oxygen-containing hydrocarbon such as aldehyde passes through the gas supply pipe 83 and is supplied to the exhaust pipe 16. Also, of the ozone supplied to the mixing chamber 84, the remaining ozone which is not used for the partial oxidation of the above-described hydrocarbon-based liquid 20 to the active reducing agent is supplied to the exhaust pipe 16 as it is, and a part of NO in the exhaust gas flowing through the exhaust pipe 16 is oxidized to $NO_2$ with this ozone. When NOx in which a part of NO has been oxidized to $NO_2$ with ozone and the relatively small amount of active reducing agent including the oxygen-containing hydrocarbon such as aldehyde, which has been partially oxidized with ozone, are supplied to the first selective reduction catalyst 21, $NO_2$ in NOx relatively actively reacts with the NOx reducing agent (the active reducing agent including the oxygen-containing hydrocarbon such as aldehyde) and is reduced to $N_2$.

If the exhaust gas temperature increases in the range of from 200 to 250° C., the controller 64 controls the compressor, the flow rate regulation valve, and the high-voltage power source device of the ozone generation device 40, respectively, to thereby increase the supply amount of ozone to the mixing chamber 84. Also, the controller 64 controls the liquid pressure regulation valve 31 and the liquid on-off valve 32 of the hydrocarbon-based liquid supply device 24, respectively, to thereby increase the supply amount of hydrocarbon-based liquid 20 to the mixing chamber 84. When ozone and the hydrocarbon-based liquid 20 are mixed in the mixing chamber 84, the amount of active reducing agent including the oxygen-containing hydrocarbon such as aldehyde, which is obtained by partial oxidation of the hydrocarbon-based liquid 20 with a part of ozone, the amount of which has been increased, increases. Also, of ozone supplied to the mixing chamber 84, the remaining ozone which are not used for the partial oxidation of the above-described hydrocarbon-based liquid 20 to the active reducing agent also increases, and the amount of $NO_2$ obtained by the oxidation of the part of NO in the exhaust gas flowing through the exhaust pipe 16 with this ozone increases as well. When NOx containing $NO_2$, the amount of which has been increased, and the active reducing agent including such as aldehyde, the amount of which has been increased, are supplied to the first selective reduction catalyst 21, NO$_2$ in NOx actively reacts with the NOx reducing agent (the active reducing agent such as aldehyde,) and is reduced to N$_2$, and a decrease rate of NOx in the exhaust gas is abruptly enhanced with an increase of the exhaust gas temperature.

If the exhaust gas temperature is in the range of from 250 to 500° C., the controller 64 controls the compressor, the flow rate regulation valve, and the high-voltage power source device of the ozone generation device 40, respectively, to thereby slightly decrease the supply amount of ozone to the exhaust pipe 16 as compared with the case where the exhaust gas temperature is in the range of from 200 to 250° C. Also, the controller 64 controls the liquid pressure regulation valve 31 and the liquid on-off valve 32 of the hydrocarbon-based liquid supply device 24, respectively, to thereby make the supply amount of hydrocarbon-based liquid 20 to the exhaust pipe 16 be substantially equal to that in the case where the exhaust gas temperature is in the range of from 200 to 250° C. (it should be noted that its supply amount is changed according to the exhaust gas flow rate). Here, the reason why the supply amount of ozone to the exhaust pipe 16 is slightly decreased is that when the exhaust gas temperature becomes as high as from 250 to 500° C., ozone is susceptible to thermal decomposition, and therefore, even if ozone is supplied to the exhaust pipe 16 at a high temperature, a part of NO in the exhaust gas is hardly oxidized to NO$_2$ with ozone. It is noted that even if the exhaust gas temperature becomes high, ozone and the hydrocarbon-based liquid 20 are mixed in the mixing chamber 84 of the gas supply device 81 at a relatively low temperature, and therefore, the hydrocarbon-based liquid can be partially oxidized with ozone to the active reducing agent such as aldehyde. Even if the active reducing agent such as aldehyde is supplied to the exhaust pipe 16 at a high temperature, it is not thermally decomposed. When NOx slightly containing NO$_2$ obtained by oxidation of a part of NO with ozone and the active reducing agent including the oxygen-containing hydrocarbon such as aldehyde in an amount substantially equal to that in the case where the exhaust gas temperature is in the range of from 200 to 250° C. are supplied to the first selective reduction catalyst 21, NO$_2$ in NOx actively reacts with the NOx reducing agent (the active reducing agent including an oxygen-containing hydrocarbon such as aldehyde,) and is reduced to N$_2$, and even if the exhaust gas temperature increases, a decrease rate of NOx in the exhaust gas is kept in a relatively high level.

Meanwhile, similarly to the first embodiment, if the exhaust gas temperature is in the range of from 250 to 500° C., and a surplus gasified hydrocarbon-based liquid flows into the silver-based first selective reduction catalyst 21 together with the exhaust gas containing NOx, ammonia is generated on this first selective reduction catalyst 21. When this exhaust gas containing ammonia flows into the copper-based, iron-based, or vanadium-based second reduction type catalyst 22, NOx (NO and NO$_2$) in the exhaust gas reacts with ammonia on the second selective reduction catalyst 22 and is reduced to N$_2$. As a result, NOx in the exhaust gas can be more efficiently decreased over a wide range of exhaust gas temperatures from 150 to 500° C. The operations other than those described above are substantially the same as the operations in the fourth embodiment, and therefore, redundant description thereof will be omitted.

Sixth Embodiment

Figure 11:
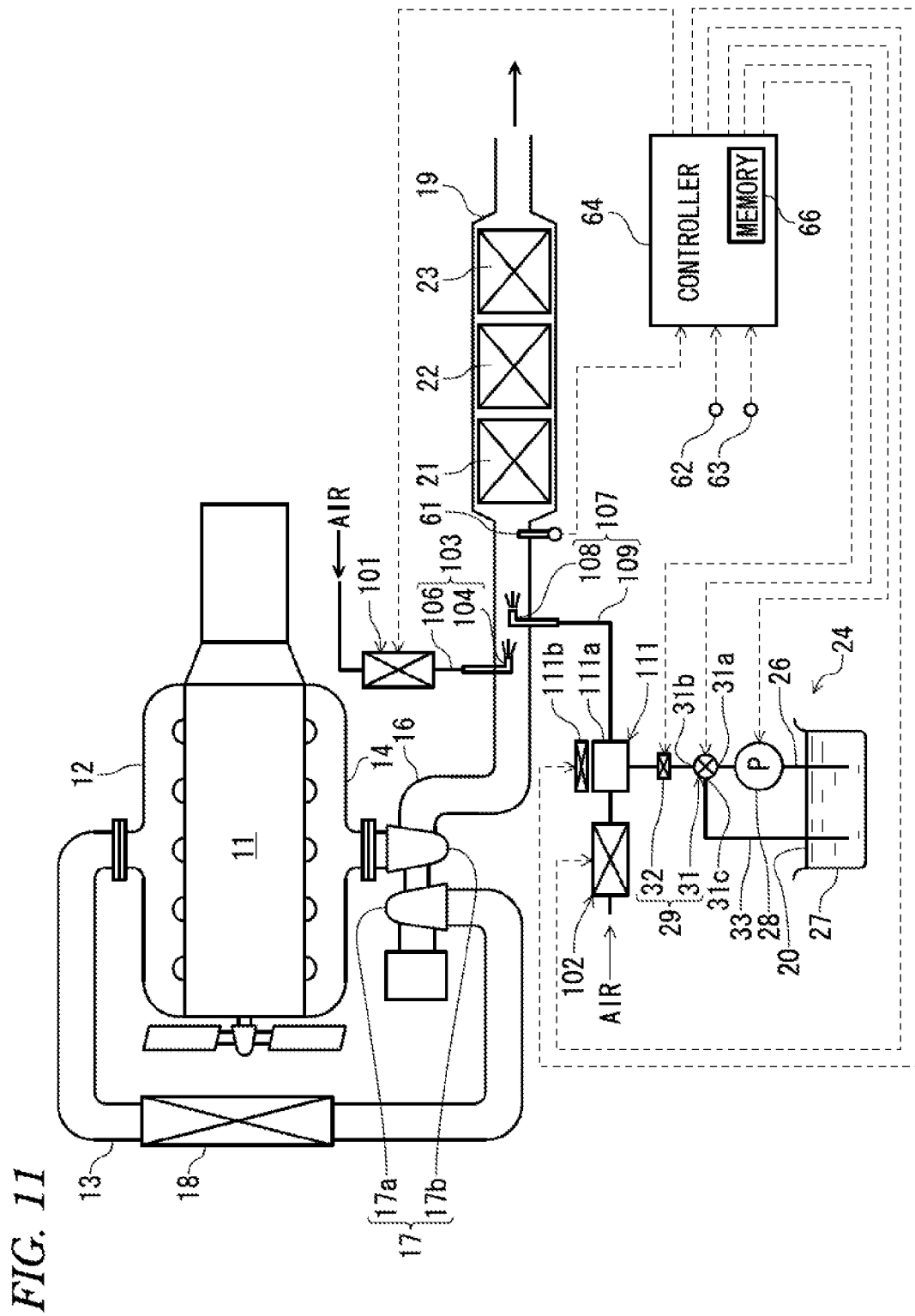
FIG. 11 is a configuration diagram showing an exhaust gas purifier of a sixth embodiment of the present invention.

FIG. 11 shows a sixth embodiment of the present invention. In FIG. 11, the same reference signs as those in FIG. 9 indicate the same components. In this embodiment, the ozone generation device has the first ozone generation device 101 and the second ozone generation device 102. The configuration of each of the first ozone generation device 101 and the second ozone generation device 102 is the same as that in the ozone generation device of the fourth embodiment. The first ozone generation device 101 is connected to the exhaust pipe 16 on the exhaust gas upstream side of the first selective reduction catalyst 21 via the ozone supply device 103. The ozone supply device 103 includes the ozone injection nozzle 104 extending into the exhaust pipe 16 on the exhaust gas upstream side of the first selective reduction catalyst 21, and the ozone supply pipe 106 having a tip end connected to the ozone injection nozzle 104 and a base end connected to the first ozone generation device 101. Also, the second ozone generation device 102 is connected, via the gas supply device 107, to the exhaust pipe 16 on the exhaust gas upstream side of the first selective reduction catalyst 21 and on the exhaust gas downstream side of the ozone injection nozzle 104. The gas supply device 107 includes a gas injection nozzle 108 extending into the exhaust pipe 16 on the exhaust gas upstream side of the first selective reduction catalyst 21 and on the exhaust gas downstream side of the ozone injection nozzle 104, and the gas supply pipe 109 having a tip end connected to the gas injection nozzle 108 and a base end connected to the second ozone generation device 102. It is noted that in this embodiment, while the second ozone generation device is connected, via the gas supply device, to the exhaust pipe on the exhaust gas upstream side of the first selective reduction catalyst and on the exhaust gas downstream side of the ozone injection nozzle, the second ozone generation device may be connected, via the gas supply device, to the exhaust gas on the exhaust gas upstream side of the first selective reduction catalyst and on the exhaust gas upstream side of the ozone injection nozzle.

Also, the hydrocarbon-based liquid supply device 24 is connected to an intermediate portion of the gas supply device 107. That is, a tip end of the liquid supply pipe 26 is connected to an intermediate portion of the gas supply pipe 109. Furthermore, a mixing chamber 111 is provided in a connection portion between the hydrocarbon-based liquid supply device 24 and the gas supply device 107. That is, the mixing chamber 111 is provided in a connection portion between the liquid supply pipe 26 and the gas supply pipe 109. This mixing chamber 111 includes the box 111a having a mixer built therein and the heater 111b that is provided on an outer surface of this box 111a and that heats the inside of the box 111a to about 250° C. With this configuration, ozone and a hydrocarbon-based liquid can be efficiently mixed. It is noted that in this embodiment, while two ozone generation devices of the first and second ozone generation devices are provided, a single ozone generation device may be provided and ozone generated by this ozone generation device may be switched in a predetermined ratio between ozone to be supplied directly to the exhaust pipe and ozone to be supplied to the mixing chamber. Except what is described above, the configuration is the same as that in the fourth embodiment.

The operation of the thus configured exhaust gas purifier will be described. Similarly to the above-described fourth embodiment, when the exhaust gas temperature is in the range of from 150 to 200° C. and the hydrocarbon-based liquid 20 is injected from the liquid injection nozzle 25, even if the hydrocarbon-based liquid 20 does not react with the first and second selective reduction catalysts 21 and 22, the hydrocarbon-based liquid 20 reacts with NOx in the exhaust gas on the noble metal-based third selective reduction catalyst 23, which can cause NOx in the exhaust gas to exhibit the reducing performance, and NOx is rapidly reduced on the third selective reduction catalyst 23. Therefore, NOx can be efficiently decreased in a low temperature region of the exhaust gas.

If the exhaust gas temperature is in the range of from 200 to 250° C., the controller 64 controls the compressor, the flow rate regulation valve, and the high-voltage power source device of the first ozone generation device 101, respectively, to thereby supply a relatively small amount of ozone to the exhaust pipe 16. Also, ozone is not supplied to the mixing chamber 111 by keeping the compressor, the flow rate regulation valve, and the high-voltage power source device of the second ozone generation device 102 are in a halt state. Furthermore, the controller 64 controls the liquid pressure regulation valve 31 and the liquid on-off valve 32 of the hydrocarbon-based liquid supply device 24, respectively, to thereby supply a relatively small amount of the hydrocarbon-based liquid 20 to the mixing chamber 111. At that time, the hydrocarbon-based liquid 20 is gasified by the heater 111*b* of the mixing chamber 111. Since ozone is not supplied to the inside of the mixing chamber 111, the gasified hydrocarbon-based liquid 20 passes through the gas supply pipe 26 and is supplied directly to the exhaust pipe 16. When ozone generated by the first ozone generation device 101 passes through the ozone supply pipe 106 and is supplied to the exhaust pipe 16, a part of NO in the exhaust gas flowing through the exhaust pipe 16 is oxidized to $NO_2$ with this ozone. When NOx in which a part of NO has been oxidized to $NO_2$ with ozone and a relatively small amount of the gasified hydrocarbon-based liquid are supplied to the first selective reduction catalyst 21, $NO_2$ in NOx relatively actively reacts with the NOx reducing agent (the gasified hydrocarbon-based liquid) and is reduced to $N_2$.

If the exhaust gas temperature increases in the range of from 200 to 250° C., the controller 64 controls the compressor, the flow rate regulation valve, and the high-voltage power source device of the first ozone generation device 101, respectively, to thereby increase the supply amount of ozone to the exhaust pipe 16. Also, the controller 64 controls the compressor, the flow rate regulation valve, and the high-voltage power source device of the second ozone generation device 102, respectively, to thereby supply a relatively large amount of ozone to the mixing chamber 111. Furthermore, the controller 64 controls the liquid pressure regulation valve 31 and the liquid on-off valve 32 of the hydrocarbon-based liquid supply device 24, respectively, to thereby increase the supply amount of hydrocarbon-based liquid 20 to the mixing chamber 111. When ozone and the hydrocarbon-based liquid 20 are mixed in the mixing chamber 111, the hydrocarbon-based liquid 20 is efficiently partially oxidized to the active reducing agent including the oxygen-containing hydrocarbon such as aldehyde, with ozone the amount of which has been increased. At that time, since ozone with a high concentration and the hydrocarbon-based liquid 20 with a high concentration can be mixed in the mixing chamber 111, the reaction between ozone and the hydrocarbon-based liquid 20 becomes fast, whereby the partial oxidation of the hydrocarbon-based liquid 20 to the active reducing agent with ozone can be promoted. This partially oxidized active reducing agent including the oxygen-containing hydrocarbon such as aldehyde passes through the gas supply pipe 109 and is supplied to the exhaust pipe 16. When NOx containing $NO_2$, the amount of which has been increased, and a relatively large amount of active reducing agent including the oxygen-containing hydrocarbon such as aldehyde are supplied to the first selective reduction catalyst 21, $NO_2$ in NOx actively reacts with the NOx reducing agent (the active reducing agent including the oxygen-containing hydrocarbon such as aldehyde) and is reduced to $N_2$, and a decrease rate of NOx in the exhaust gas is abruptly enhanced with an increase of the exhaust gas temperature.

If the exhaust gas temperature is in the range of from 250 to 500° C., the controllers 64 stops the compressor, the flow rate regulation valve, and the high-voltage power source device of the first ozone generation device 101, respectively, to thereby stop the supply of ozone to the exhaust pipe 16. Also, the controller 64 controls the liquid pressure regulation valve 31 and the liquid on-off valve 32 of the hydrocarbon-based liquid supply device 24, respectively, to thereby make the supply amount of hydrocarbon-based liquid 20 to the mixing chamber 111 be substantially equal to that in the case where the exhaust gas temperature is in the range of from 200 to 250° C. (it should be noted that its supply amount is changed according to the exhaust gas flow rate). Here, the reason why the supply of ozone generated by the first ozone generation device 101 to the exhaust pipe 16 is stopped is that if the exhaust gas temperature becomes as high as from 250 to 500° C., ozone is susceptible to thermal decomposition, and therefore, even if ozone is supplied to the exhaust pipe 16 at a high temperature, a part of NO in the exhaust gas is hardly oxidized to $NO_2$ with ozone.

Also, even if the exhaust gas temperature becomes high, ozone and the hydrocarbon-based liquid 20 are mixed in the mixing chamber 111 of the gas supply device 107 at a relatively low temperature, and therefore, the hydrocarbon-based liquid can be partially oxidized with ozone to the active reducing agent including the oxygen-containing hydrocarbon such as aldehyde. Furthermore, even if active reducing agent such as aldehyde is supplied to the exhaust pipe 16 at a high temperature, it is not thermally decomposed. If NOx which does not contain at all $NO_2$ which is obtained by oxidation of a part of NO with ozone and the active reducing agent including the oxygen-containing hydrocarbon such as aldehyde, in an amount substantially equal to that in the case where the exhaust gas temperature is in the range of from 200 to 250° C. are supplied to the first selective reduction catalyst 21, NOx actively reacts with the NOx reducing agent (the active reducing agent including the oxygen-containing hydrocarbon such as aldehyde,) and is reduced to $N_2$, and even if the exhaust gas temperature increases, a decrease rate of NOx in the exhaust gas is kept in a high level.

It is noted that in the above-described first to sixth embodiments, the exhaust gas purifier of the present invention is applied to the diesel engine. However, the exhaust gas purifier of the present invention may also be applied to a gasoline engine. Also, in the above-described first to sixth embodiments, the exhaust gas purifier of the present invention is applied to the turbo supercharger-equipped diesel engine. However, the exhaust gas purifier of the present invention may also be applied to a natural aspiration type diesel engine or a natural aspiration type gasoline engine. Also, in the above-described first to sixth embodiments, the moisture in the dryer is removed by the nitrogen-rich gas separated by the air separator of the ozone generation device, to thereby regenerate the dryer. However, the moisture in the dryer may be removed by a part of the compressed air compressed by the compressor and dried by the dryer, to thereby regenerate the dryer. Also, in the above-described first to sixth embodiments, the silent discharge type ozone generator is used. However, a creeping discharge type ozone generator, an ozone generator that irradiates air with ultraviolet rays to generate ozone, an ozone generator that electrolyzes water to generate ozone, or the like may also be used. Also, in the above-described first to sixth embodiments, the atmosphere is taken into the ozone generation device. However, a part of the exhaust gas (containing oxygen) flowing through the exhaust pipe may be taken thereinto. Also, in the above-described first to sixth Embodiments, the air tank is provided between the compressor and the dryer. However, in the case where the flow rates of the oxygen-rich gas and the nitrogen-rich gas do not abruptly change, the air tank may not be provided. Furthermore, in the above-described first to sixth embodiments, the nitrogen-rich gas introduced from the purge gas inlet 42*g* of the dryer 42 is allowed to pass from the purge gas outlet 42*h* through the drain pipe 47 and then discharged. However, by connecting one end of the drain pipe 47, which has the other end connected to the purge gas outlet 42*h*, to the casing 19 on the exhaust gas downstream side of the third selective reduction catalyst 23, the nitrogen-rich gas may be allowed to pass from the purge gas outlet 42*h* through the drain pipe 47, the casing 19, and the exhaust pipe 16 and then discharged.

EXAMPLES

Next, examples of the present invention will be described in detail along with comparative examples.

Example 1

As shown in FIG. 1, the first selective reduction catalyst 21 was provided in the exhaust pipe 16 of the straight six turbo supercharger-equipped diesel engine 11 of 8,000 cc displacement. Also, the liquid injection nozzle 25, which supplies the hydrocarbon-based liquid 20, was provided in the exhaust pipe 16 on the exhaust gas upstream side of the first selective reduction catalyst 21. Here, the selective reduction catalyst 19 was a silver-based catalyst manufactured by coating a honeycomb carrier with a slurry containing a zeolite powder having been ion-exchanged with silver. Also, the ozone injection nozzle 38, which supplies ozone, was provided in the exhaust pipe 16 on the exhaust gas upstream side of the liquid injection nozzle 25. The tip end of the ozone supply pipe 39 was connected to the ozone injection nozzle 38, and the base end of the ozone supply pipe 39 was connected to the fourth supply pipe 54 of the ozone generation device 40. As shown in FIGS. 2 to 4, this ozone generation device 40 had the compressor 41, the air tank 48, the dryer 42, the air separator 44, the ozone generator 43, the flow rate regulation valve 49, the check valve 56, and the high-voltage power source device 57. The compressor 41 was driven by a battery with a direct current voltage of 24 V. Here, the flow rate of ozone to be supplied from the ozone injection nozzle 38 to the exhaust pipe 16 was 100 ppm by mass with respect to 100% by mass of the exhaust gas flow rate. Also, the flow rate of the light oil (hydrocarbon-based liquid) injected in a mist state from the liquid injection nozzle 25 into the exhaust pipe 16 was 100 ppm by mass with respect to 100% by mass of the exhaust gas flow rate. This exhaust gas purifier is referred to as an example 1.

Example 2

As shown in FIG. 7, the gas injection nozzle 82 was provided to extend into the exhaust pipe 16 on the exhaust gas upstream side of the first selective reduction catalyst 21, the tip end of the gas supply pipe 83 was connected to the gas injection nozzle 82, and the base end of the gas supply pipe 83 was connected to the ozone generation device 40. Also, the tip end of the liquid supply pipe 26 of the hydrocarbon-based liquid supply device 24 was connected on the intermediate portion of the gas supply pipe 83. Furthermore, the mixing chamber 84 having the heater 84*b* was provided in the connection portion between the liquid supply pipe 26 and the gas supply pipe 83. Except for what is described above, the configuration was made the same as that of the exhaust gas purifier of the example 1. This exhaust gas purifier is referred to as an example 2.

Example 3

As shown in FIG. 8, the ozone injection nozzle 104 was provided to extend into the exhaust pipe 16 on the exhaust gas upstream side of the first selective reduction catalyst 21, the tip end of the ozone supply pipe 106 was connected to the ozone injection nozzle 104, and the base end of the ozone supply pipe 106 was connected to the first ozone generation device 101. Also, the gas injection nozzle 108 was provided to extend into the exhaust pipe 16 on the exhaust gas upstream side of the first selective reduction catalyst 21 and on the exhaust gas downstream side of the ozone injection nozzle 104, the tip end of the gas supply pipe 109 was connected to the gas injection nozzle 108, and the base end of the gas supply pipe 109 was connected to the second ozone generation device 102. Also, the tip end of the liquid supply pipe 26 of the hydrocarbon-based liquid supply device 24 was connected on the intermediate portion of the gas supply pipe 109. Furthermore, the mixing chamber 111 having the heater 111*b* was provided in the connection portion between the liquid supply pipe 26 and the gas supply pipe 109. Except what is described above, the configuration was made the same as that of the exhaust gas purifier of the example 1. This exhaust gas purifier is referred to as an example 3.

Comparative Example 1

The configuration was made the same as that of the exhaust gas purifier of the example 1, except that the ozone generation device, the ozone injection nozzle, and the ozone supply pipe were not provided. This exhaust gas purifier is referred to as a comparative example 1.

<Comparison Test 1 and Evaluation>

At the time of gradually increasing the exhaust gas temperature from the room temperature to 600° C. by varying a revolution speed and a load of the engine, a decrease rate of NOx by each of the exhaust gas purifiers of the examples 1 to 3 and the comparative example 1 was measured. Results are shown in FIG. 12.

Figure 12:
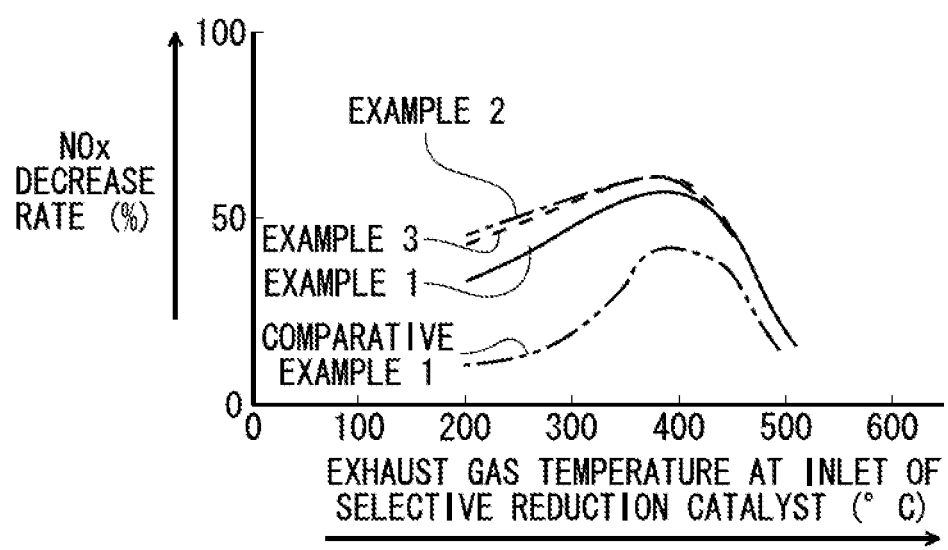
FIG. 12 is a graph showing a change of NOx decrease rate with a change of exhaust gas temperature when exhaust gas purifiers of examples 1 to 3 and a comparative example 1 are used.

As can be seen from FIG. 12, in the exhaust gas purifier of the comparative example 1, the NOx decrease rate was low and about 40% at maximum. On the other hand, it was found that in the exhaust gas purifier of the example 1, the NOx decrease rate was high and about 55% at maximum, in the exhaust gas purifier of the example 2, the NOx decrease rate became higher and about 60% at maximum, and in the exhaust gas purifier of the example 3, the NOx decrease rate became about 60% at maximum.

Example 4

The configuration was made the same as that of the exhaust gas purifier of the example 1, except that a silver-based catalyst to which palladium was added and which was manufactured by coating a honeycomb carrier with a slurry containing a zeolite powder having been ion-exchanged with silver and palladium was used as the first selective reduction catalyst. This exhaust gas purifier is referred to as an example 4.

<Comparison Test 2 and Evaluation>

At the time of gradually increasing the exhaust gas temperature from the room temperature to 600° C. by varying a revolution speed and a load of the engine, a decrease rate of NOx by each of the exhaust gas purifiers of the examples 1 and 4 was measured. Results are shown in FIG. 13.

Figure 13:
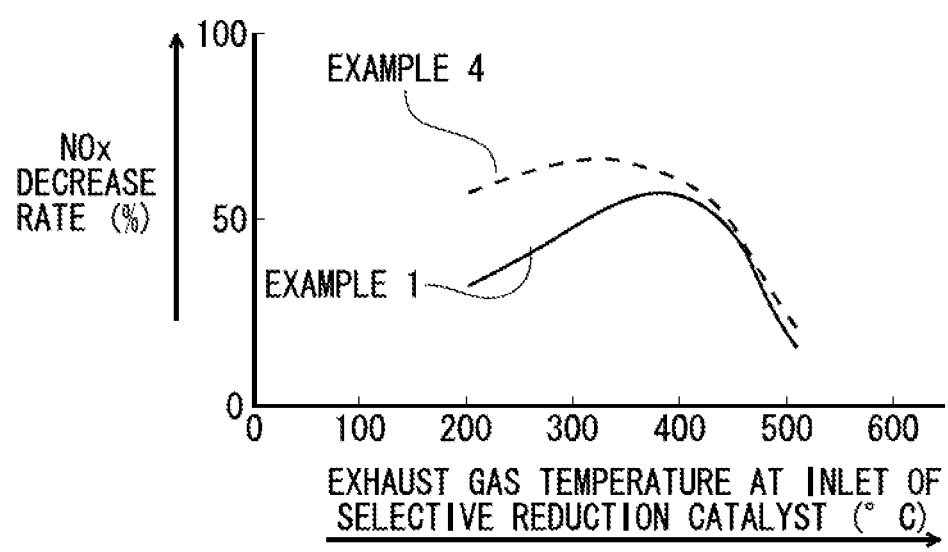
FIG. 13 is a graph showing a change of NOx decrease rate with a change of exhaust gas temperature when exhaust gas purifiers of examples 1 and 4 are used.

As can be seen from FIG. 13, in the exhaust gas purifier of the example 1, the NOx decrease rate was about 30% at a relatively low temperature of about 200° C., whereas in the exhaust gas purifier of the example 4, the NOx decrease rate became as high as about 55% at a relatively low temperature of about 200° C. Accordingly, it was found that in the case where the silver-based catalyst to which palladium was added was used as the selective reduction catalyst, the decreasing performance of NOx in the exhaust gas at a relatively low temperature of the exhaust gas temperature could be enhanced as compared with the case the case where the palladium-free silver-based catalyst was used.

Examples 5

As shown in FIG. 9, in the exhaust pipe 16 of the straight six turbo supercharger-equipped diesel engine 11 of 8,000 cc displacement, the first selective reduction catalyst 21, the second selective reduction catalyst 22, and the third selective reduction catalyst 23 were provided in this order from the exhaust gas upstream side toward the exhaust gas downstream side. Also, the liquid injection nozzle 25, which supplies the hydrocarbon-based liquid 20, was provided in the exhaust pipe 16 on the exhaust gas upstream side of the first selective reduction catalyst 21. Here, the first selective reduction catalyst 21 was a silver-based catalyst which was manufactured by coating a honeycomb carrier with a slurry containing a zeolite powder having been ion-exchanged with silver. Also, the second selective reduction catalyst 22 was a copper-based catalyst which was manufactured by coating a honeycomb carrier with a slurry containing a zeolite powder having been ion-exchanged with copper. Furthermore, the third selective reduction catalyst 23 was a platinum-based catalyst which was manufactured by coating a honeycomb carrier with a slurry containing a zeolite powder having been ion-exchanged with platinum.

Meanwhile, the ozone injection nozzle 38, which supplies ozone, was provided in the exhaust pipe 16 on the exhaust gas downstream side of the liquid injection nozzle 25. The tip end of the ozone supply pipe 39 was connected to the ozone injection nozzle 38, and the base end of the ozone supply pipe 39 was connected to the fourth supply pipe 54 of the ozone generation device 40. The constitution of this ozone generation device 40 was made the same as that in the ozone generation device of the example 1. The compressor was driven by a battery with a direction current voltage of 24 V. Here, the flow rate of ozone to be supplied from the ozone injection nozzle 38 into the exhaust pipe 16 was 100 ppm by mass with respect to 100% by mass of the exhaust gas flow rate. Also, the flow rate of the light oil (hydrocarbon-based liquid) injected in a mist state from the liquid injection nozzle 25 into the exhaust pipe 16 was 100 ppm by mass with respect to 100% by mass of the exhaust gas flow rate. This exhaust gas purifier is referred to as an example 5.

Example 6

As shown in FIG. 10, the gas injection nozzle 82 was provided to extend into the exhaust pipe 16 on the exhaust gas upstream side of the first selective reduction catalyst 21, the tip end of the gas supply pipe 83 was connected to the gas injection nozzle 82, and the base end of the gas supply pipe 83 was connected to the ozone generation device 40. Also, the tip end of the liquid supply pipe 26 of the hydrocarbon-based liquid supply device 24 was connected on the intermediate portion of the gas supply pipe 83. Furthermore, the mixing chamber 84 having the heater 84b was provided in the connection portion between the liquid supply pipe 26 and the gas supply pipe 83. Except what is described above, the configuration was made the same as that of the exhaust gas purifier of the example 5. This exhaust gas purifier is referred to as an example 6.

Example 7

As shown in FIG. 11, the ozone injection nozzle 104 was provided to extend into the exhaust pipe 16 on the exhaust gas upstream side of the first selective reduction catalyst 21, the tip end of the ozone supply pipe 106 was connected to the ozone injection nozzle 104, and the base end of the ozone supply pipe 106 was connected to the first ozone generation device 101. Also, the gas injection nozzle 108 was provided to extend into the exhaust pipe 16 on the exhaust gas upstream side of the first selective reduction catalyst 21 and on the exhaust gas downstream side of the ozone injection nozzle 104, the tip end of the gas supply pipe 109 was connected to the gas injection nozzle 108, and the base end of the gas supply pipe 109 was connected to the second ozone generation device 102. Also, the tip end of the liquid supply pipe 26 of the hydrocarbon-based liquid supply device 24 was connected on the intermediate portion of the gas supply pipe 109. Furthermore, the mixing chamber 111 having the heater 111b was provided in the connection portion between the liquid supply pipe 26 and the gas supply pipe 109. Except what is described above, the configuration was made the same as that of the exhaust gas purifier of the example 5. This exhaust gas purifier is referred to as an example 7.

Comparative Example 2

The configuration was made the same as that of the exhaust gas purifier of the example 5, except that the ozone generation device, the ozone injection nozzle, and the ozone supply pipe were not provided. This exhaust gas purifier was made Comparative Example 2.

<Comparison Test 3 and Evaluation>

Similar to the comparison test 1, at the time of gradually increasing the exhaust gas temperature from the room temperature to 600° C. by varying a revolution speed and a load of the engine, a decrease rate of NOx by each of the exhaust gas purifiers of the examples 5 to 7 and the comparative example 2 was measured. Results are shown in FIG. 14.

Figure 14:
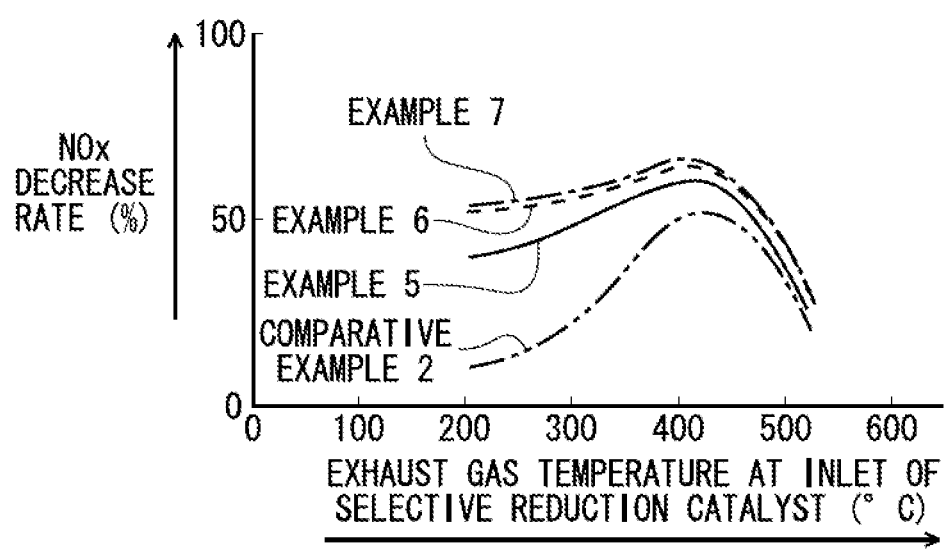
FIG. 14 is a graph showing a change of NOx decrease rate with a change of exhaust gas temperature when exhaust gas purifiers of examples 5 to 7 and a comparative Example 2 are used.

As can be seen from FIG. 14, in the exhaust gas purifier of the comparative example 2, the NOx decrease rate was low and about 50% at maximum. On the other hand, it is found that in the exhaust gas purifier of the example 5, the NOx decrease rate became high and about 55% at maximum, in the exhaust gas purifier of the example 6, the NOx decrease rate became higher and about 70% at maximum, and in the exhaust gas purifier of the example 7, the NOx decrease rate also became about 70% at maximum.

Example 8

The configuration was made the same as that of the exhaust gas purifier of the example 5, except that a palladium silver-based catalyst to which palladium was added which was manufactured by coating a honeycomb carrier with a slurry containing a zeolite powder having been ion-exchanged with silver and palladium was used as the first selective reduction catalyst. This exhaust gas purifier is referred to as an example 8.

<Comparison Test 4 and Evaluation>

Similar to the comparison test 2, at the time of gradually increasing the exhaust gas temperature from the room temperature to 600° C. by varying a revolution speed and a load of the engine, a decrease rate of NOx by each of the exhaust gas purifiers of the examples 5 and 8 was measured. Results are shown in FIG. 15.

Figure 15:
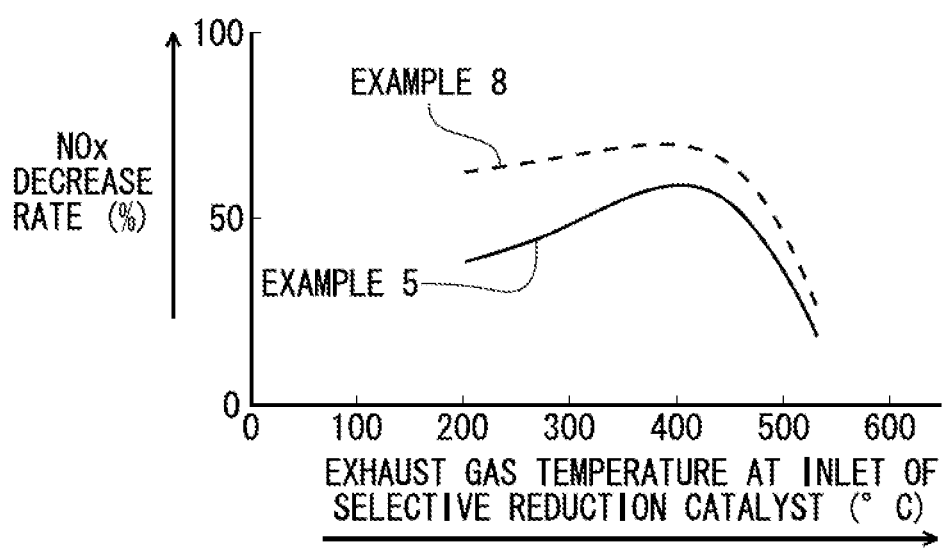
FIG. 15 is a graph showing a change of NOx decrease rate with a change of exhaust gas temperature when exhaust gas purifiers of examples 5 and 8 are used.

As can be seen from FIG. 15, in the exhaust gas purifier of the example 5, the NOx decrease rate was about 40% at a relatively low temperature of about 200° C., whereas in the exhaust gas purifier of the example 8, the NOx decrease rate became high and about 65% at the relatively low temperature of about 200° C. Accordingly, it is found that in the case where the silver-based catalyst to which palladium is added is used as the first selective reduction catalyst, the decreasing performance of NOx in the exhaust gas at the relatively low temperature of the exhaust gas temperature can be enhanced as compared with the case where the palladium-free silver-based catalyst is used.

INDUSTRIAL APPLICABILITY

The exhaust gas purifier of the present invention can be utilized for decreasing NOx contained in an exhaust gas of an engine such as a diesel engine, to thereby purify the exhaust gas.

It is noted that this internal application claims the priority of Japanese Patent Application Nos. 2011-192768 and 2011-192770 both filed on Sep. 5, 2011, and the contents of Japanese Patent Application Nos. 2011-192768 and 2011-192770 are incorporated herein in their entirety.

The invention claimed is:

1. An exhaust gas purifier comprising:
a first selective reduction catalyst that is provided in an exhaust pipe of an engine and that includes a silver-based catalyst;
a second selective reduction catalyst that is provided in the exhaust pipe on an exhaust gas downstream side of the first selective reduction catalyst and that includes a copper-based catalyst, an iron-based catalyst, or a vanadium-based catalyst;
a third selective reduction catalyst that includes a noble metal-based catalyst and that is provided in the exhaust pipe on the exhaust gas downstream side of the second selective reduction catalyst;
an ozone generator that generates ozone by using oxygen in an atmosphere or an exhaust gas; and
a hydrocarbon-based liquid supply,
a part of NO in the exhaust gas flowing through the exhaust pipe is oxidized to $NO_2$ with ozone generated by the ozone generator,
said $NO_2$ is supplied to the first selective reduction catalyst,
a part of the hydrocarbon-based liquid supplied from the hydrocarbon-based liquid supply is partially oxidized, with the ozone generated by the ozone generator, to an active reducing agent including an oxygen-containing hydrocarbon containing either or both of aldehyde and alcohol, and
the active reducing agent is supplied to the first selective reduction catalyst.

2. The exhaust gas purifier according to claim 1, wherein
the hydrocarbon-based liquid supply is connected to the exhaust pipe on an exhaust gas upstream side of the first selective reduction catalyst, and
the ozone generator is connected to the exhaust pipe on the exhaust gas upstream side of the first selective reduction catalyst and on the exhaust gas downstream side or the exhaust gas upstream side of a connection portion between the hydrocarbon-based liquid supply and the exhaust pipe.

3. The exhaust gas purifier according to claim 1, wherein
the ozone generator is connected to the exhaust pipe on an exhaust gas upstream side of the first selective reduction catalyst via a gas supplier, and
the hydrocarbon-based liquid supply is connected on an intermediate portion of the gas supplier.

4. The exhaust gas purifier according to claim 3, wherein a mixing chamber is provided in a connection portion between the hydrocarbon-based liquid supply and the gas supplier.

5. The exhaust gas purifier according to claim 1, wherein
the ozone generator includes a first ozone generator and a second generator device,
the first ozone generator is connected to the exhaust pipe on an exhaust gas upstream side of the first selective reduction catalyst via an ozone supplier,
the second ozone generator is connected, via a gas supplier, to the exhaust pipe on the exhaust gas upstream side of the first selective reduction catalyst and on an exhaust gas downstream side or the exhaust gas upstream side of a connection portion between the first ozone generator and the exhaust pipe, and
the hydrocarbon-based liquid supply is connected to an intermediate portion of the gas supplier.

6. The exhaust gas purifier according to claim 5, wherein a mixing chamber is provided in a connection portion between the hydrocarbon-based liquid supply and the gas supply supplier.

7. The exhaust gas purifier according to claim 1, wherein the first selective reduction catalyst includes a honeycomb carrier coated with a silver zeolite or a silver alumina.

8. The exhaust gas purifier according to claim 1, wherein the second selective reduction catalyst includes a honeycomb carrier coated with a copper zeolite, an iron zeolite, or a vanadium-based oxide.

9. The exhaust gas purifier according to claim 1, wherein the third selective reduction catalyst includes a honeycomb carrier coated with a noble metal.

10. The exhaust gas purifier according to claim 1, wherein the first selective reduction catalyst includes coating a honeycomb carrier coated with a silver zeolite to which palladium is added or a silver alumina to which palladium is added.

* * * * *